United States Patent
Agarwal et al.

(10) Patent No.: US 11,553,343 B2
(45) Date of Patent: Jan. 10, 2023

(54) REAL-TIME SOFT COMBINING, CRC VALIDATION, AND MIC VALIDATION OF DECRYPTED PACKETS

(71) Applicant: QUALCOMM Incorporated, San Diego, CA (US)

(72) Inventors: Vishal Agarwal, Ramnagar (IN); Huibert Denboer, Escondido, CA (US); Giriraj Goyal, Bangalore (IN)

(73) Assignee: QUALCOMM INCORPORATED, San Diego, CA (US)

( * ) Notice: Subject to any disclaimer, the term of this patent is extended or adjusted under 35 U.S.C. 154(b) by 815 days.

(21) Appl. No.: 16/218,396

(22) Filed: Dec. 12, 2018

(65) Prior Publication Data

US 2020/0196153 A1    Jun. 18, 2020

(51) Int. Cl.
| | |
|---|---|
| *H04L 29/06* | (2006.01) |
| *H04W 12/106* | (2021.01) |
| *H04W 4/80* | (2018.01) |
| *H04L 1/00* | (2006.01) |
| *H04L 1/16* | (2006.01) |
| *H04L 5/00* | (2006.01) |

(52) U.S. Cl.
CPC ......... *H04W 12/106* (2021.01); *H04L 1/0003* (2013.01); *H04L 1/1614* (2013.01); *H04L 5/0055* (2013.01); *H04W 4/80* (2018.02)

(58) Field of Classification Search
CPC .... H04W 12/106; H04W 4/80; H04L 1/0003; H04L 1/1614; H04L 5/0055; H04L 63/0428; H04L 1/1845; H04L 1/0061
See application file for complete search history.

(56) References Cited

U.S. PATENT DOCUMENTS

| | | | |
|---|---|---|---|
| 2008/0288845 A1 | 11/2008 | Tsfati et al. | |
| 2013/0010960 A1 | 1/2013 | Ho et al. | |
| 2013/0191706 A1 | 7/2013 | Zopf | |
| 2014/0006890 A1* | 1/2014 | Li | H04L 1/1812 |
| | | | 714/748 |
| 2014/0059407 A1* | 2/2014 | Zopf | H03M 13/05 |
| | | | 714/776 |
| 2016/0021066 A1* | 1/2016 | Parvathaneni | H04W 12/033 |
| | | | 713/171 |
| 2017/0078290 A1 | 3/2017 | Parvathaneni | |

OTHER PUBLICATIONS

International Search Report and Written Opinion—PCT/US2019/061150—ISA/EPO—dated Mar. 12, 2020.

* cited by examiner

*Primary Examiner* — Yogesh Paliwal
(74) *Attorney, Agent, or Firm* — Procopio, Cory, Hargreaves & Savitch LLP

(57) ABSTRACT

The apparatus receives a first PDU and a first CRC that is based on the first PDU. The first PDU is encrypted based on a first nonce. The apparatus decrypts the first PDU to obtain a first payload and a first cipher stream. The apparatus soft combines the decrypted first payload with a decrypted set of payloads. The set of payloads have been encrypted based on at least one nonce different than the first nonce. The apparatus generates a second CRC based on the soft combined decrypted payloads and based on the first cipher stream. The apparatus determines whether the generated second CRC for the soft combined decrypted payloads passes a CRC check against the first CRC.

19 Claims, 14 Drawing Sheets

REAL-TIME SOFT COMBINING, CRC VALIDATION, AND MIC VALIDATION OF DECRYPTED PACKETS

BACKGROUND

Field

The present disclosure relates generally to communication systems, and more particularly, to soft combining of decrypted packets.

Background

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range communication protocols (e.g., a Bluetooth® (BT) protocol, a Bluetooth® Low Energy (BLE) protocol, a Zigbee® protocol, etc.), provide wireless connectivity to peripheral devices by providing wireless links that allow connectivity within a specific distance (e.g., 5 meters, 10 meter, 20 meters, 100 meters, etc.).

BT is a short-range wireless communication protocol that supports a WPAN between a central device (e.g., a master device) and at least one peripheral device (e.g., a slave device). Power consumption associated with BT communications may render BT impractical in certain applications, such as applications in which an infrequent transfer of data occurs.

To address the power consumption issue associated with BT, BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. A BLE communications link between two devices may be established using, e.g., hardware, firmware, host operating system, host software stacks, and/or host application support. Example applications that use BLE include battery-operated sensors and actuators in various medical, industrial, consumer, and fitness applications. BLE may be used to connect devices such as BLE enabled smart phones, tablets, and laptops. While traditional BLE offers certain advantages over BT, BLE and BT may not be able to validate the combination of decrypted data packets in an effort to decode the data error free. Transmitted and re-transmitted data packets may be encrypted using different encryption parameters, which may cause the re-transmitted data packets to appear as different data packets despite having the same payload.

There exists a need for an operation to validate the combination of decrypted data packets in wireless communications where a data packet and its retransmission may be sent using different encryption parameters.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

BLE was developed and adopted in various applications in which an infrequent transfer of data occurs. BLE exploits the infrequent transfer of data by using a low duty cycle operation, and switching at least one of the central device and/or peripheral device(s) to a sleep mode in between data transmissions. Example applications that use BLE include battery-operated sensors and actuators in various medical, industrial, consumer, and fitness applications. The BLE applications often connect to devices such as BLE enabled smart phones, tablets, and laptops.

While traditional BLE offers certain advantages, the traditional BLE protocol provides only for error detection in the payload of a data packet through the use of a cyclic redundancy check (CRC). Thus, according to the traditional BLE protocol, retransmission is the means by which errors in the payload may be "corrected," where correction via retransmission is different than the dynamic correction of the same data packet enabled through FEC. That is, FEC actually corrects the errors in the same data packet, while the retransmission corrects the errors of the current data packet by replacing the current data packet with another version of the data payload, which may or may not include errors.

Failing error correction in the traditional BLE protocol, an erroneous data packet may be replaced with a special packet that in effect defines silence or packet loss concealment. The silence packet and/or packet loss concealment may reduce communication quality because portions of the communication may be omitted (e.g., voice breaks during a voice call).

As many applications, such as wireless headsets used with cellular phones, require mostly error free (e.g., low error rate data streams) data to accurately reproduce a telephone conversation, uncorrected erroneous data packets may impact a perceived quality of a given application.

In addition, using the error correction techniques of traditional BLE may not only reduce the perceived audio quality of a given application, but may also limit a transmit power reduction of a BLE air interface packet due to a limited sensitivity at the receiving device. The receiving device sensitivity may be correlated with the lowest signal power level from which the receiving device may obtain information from a BLE air interface packet without meeting a Bit Error Rate (BER) threshold. Hence, the receiving device sensitivity may limit the transmit power reduction for a BLE air interface packet.

Validation of a correctly received packet may be done through the use of CRC. Incorrectly received packets may cause the packet to be retransmitted in response to a request for a new message sent to the transmitting device by the receiving device. The two or more packets may be combined until the receiving device can decode the message error free. Over the air bit errors may cause numerous retransmissions, but if the retransmitted packet is encrypted using different encryption parameters, such as but not limited to Nonce, then the retransmitted packet will appear to be different than the originally transmitted packet despite having the same payload.

There exists a need for an error correction technique to validate the combination of transmitted and retransmitted decrypted data packets in wireless communications (e.g., BLE) in situations where the transmitted and retransmitted packets are encrypted using different encryption parameters (e.g., nonce).

The error correction techniques of the present disclosure promote error-correction in communication systems that lack FEC or other embedded error correction mechanisms with respect to one or more portions of a data packet by decrypting the data packet to obtain a first payload, soft combining the decrypted first payload with a decrypted set of payloads, generating a CRC based on the soft combined decrypted payloads, and determining whether the generated CRC passes a CRC check against a first CRC. The techniques therefore provide error correction for the entire packet, including packet portions not protected by any embedded error correction mechanism. As a result, data communications over noisy communication mediums may be improved as the techniques may reduce bit error rates, and increase the sensitivity of the receiving device such that the transmission power of a data packet may be reduced. For data communications involving voice or other streaming audio data, the techniques promote increased audio quality over systems that do not employ the techniques described in the present disclosure.

In an aspect of the disclosure, a method, a computer-readable medium, and an apparatus are provided. The apparatus may receive a first packet data unit (PDU) and a first CRC that is based on the first PDU. In one aspect, the first PDU may be encrypted based on a first nonce. The apparatus may decrypt the first PDU to obtain a first payload and a first cipher stream. The apparatus may soft combine the decrypted first payload with a decrypted set of payloads. In one aspect, the set of payload may be encrypted based on at least one nonce that is different than the first nonce. However, in some aspects, the set of payload may be encrypted based on a nonce that is the same as the first nonce. The apparatus may generate a second CRC based on the soft combined decrypted payloads and based on the first cipher stream. The apparatus may determine whether the generated second CRC for the soft combined decrypted payloads passes a CRC check against the first CRC.

In another aspect of the disclosure, a method, a computer-readable medium, and an apparatus are provided. The apparatus may receive a first PDU and a first CRC that is based on the first PDU. In one aspect, the first PDU may be encrypted based on a first nonce. The apparatus may decrypt the first PDU to obtain a first payload. The apparatus may obtain an error bitmap by soft combining the decrypted first payload with a decrypted set of payloads. In one aspect, the set of payloads may be encrypted based on at least one nonce different than the first nonce. However, in some aspects, the set of payload may be encrypted based on a nonce that is the same as the first nonce. The apparatus may perform an Exclusive OR (XOR) operation on the received first PDU with the obtained error bitmap to obtain a soft combined encrypted payload. The apparatus may generate a second CRC based on the soft combined encrypted payload. The apparatus may determine whether the generated second CRC for the soft combined encrypted payload passes a CRC check against the first CRC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
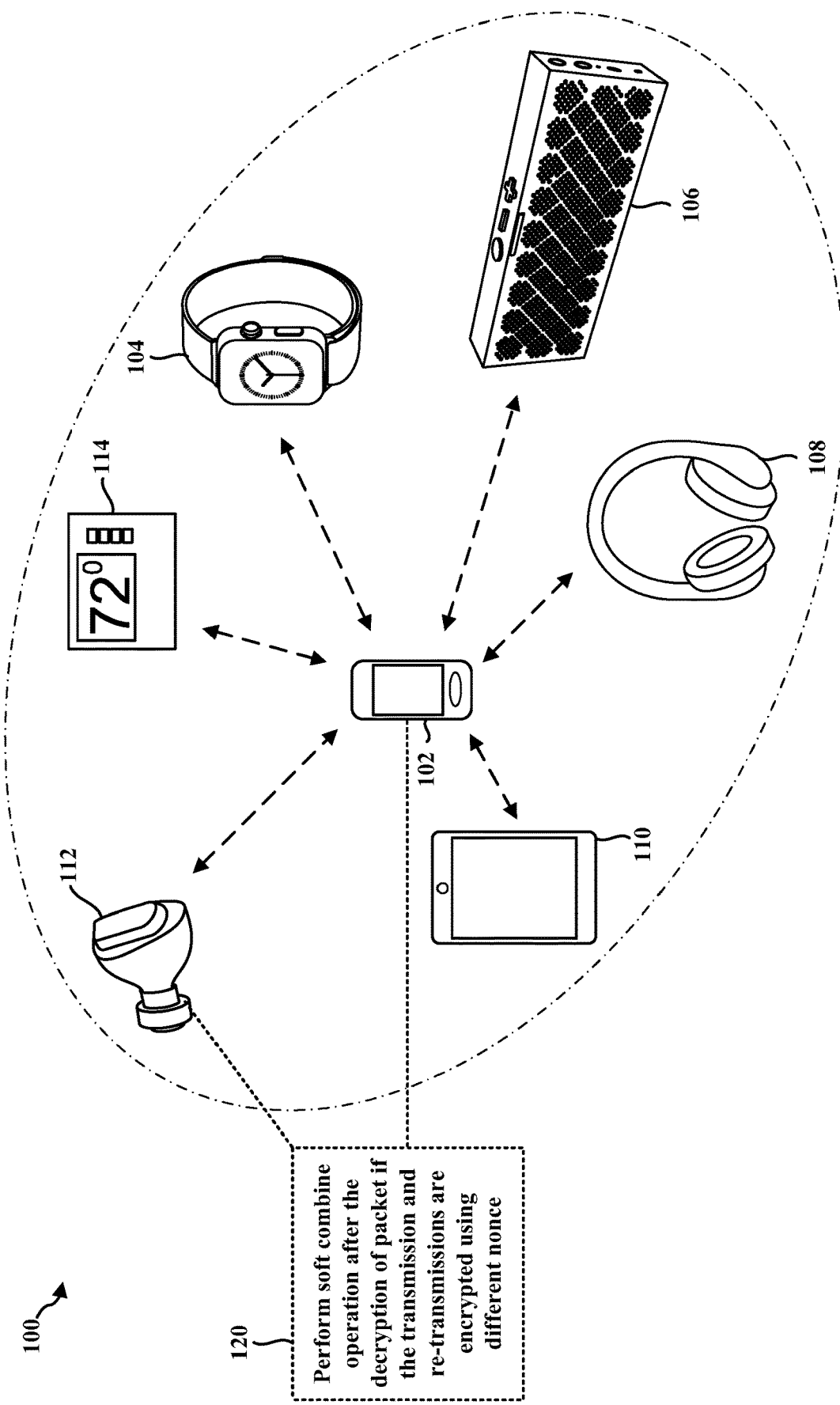
FIG. 1 is a diagram illustrating an example of a WPAN in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, 114 using the BLE protocol or the modified BLE protocol as described below in connection with any of FIGS. 2-13. The central device 102 may operate as an initiator to request establishment of a link layer (LL) connection with an intended peripheral device 104, 106, 108, 110, 112, 114.

A LL in the BLE protocol stack and/or modified BLE protocol stack (e.g., see FIG. 3) provides, as compared to BT, ultra-low power idle mode operation, simple device discovery and reliable point-to-multipoint data transfer with advanced power-save and encryption functionalities. After a requested LL connection is established, the central device 102 may become a master device and the intended peripheral device 104, 106, 108, 110, 112, 114 may become a slave device for the established LL connection. As a master device, the central device 102 may be capable of supporting multiple LL connections at a time with various peripheral devices 104, 106, 108, 110, 112, 114 (slave devices). The central device 102 (master device) may be operable to manage various aspects of data packet communication in a LL connection with an associated peripheral device 104, 106, 108, 110, 112, 114 (slave device). For example, the central device 102 may be operable to determine an operation schedule in the LL connection with a peripheral device 104, 106, 108, 110, 112, 114. The central device 102 may be operable to initiate a LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, 114 may take place within connection events.

In certain configurations, the central device 102 may be configured to transmit the first LL data PDU in each connection event to an intended peripheral device 104, 106, 108, 110, 112, 114. In certain other configurations, the central device 102 may utilize a polling scheme to poll the intended peripheral device 104, 106, 108, 110, 112, 114 for a LL data PDU transmission during a connection event. The intended peripheral device 104, 106, 108, 110, 112, 114 may transmit a LL data PDU upon receipt of packet LL data PDU from the central device 102. In certain other configurations, a peripheral device 104, 106, 108, 110, 112, 114 may transmit a LL data PDU to the central device 102 without first receiving a LL data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114 may include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, 114 in the WPAN 100, the central device 102 may communicate with more or fewer than six peripheral devices within the WPAN 100 without departing from the scope of the present disclosure.

Referring again to FIG. 1, in certain aspects, the central device 102 and/or a peripheral device (e.g., peripheral device 112) may be configured to perform a soft combine operation after the decryption of data packets if the transmission and the re-transmission of data packets are encrypted using different nonces (120), e.g., as described below in connection with any of FIGS. 2-13.

Figure 2:
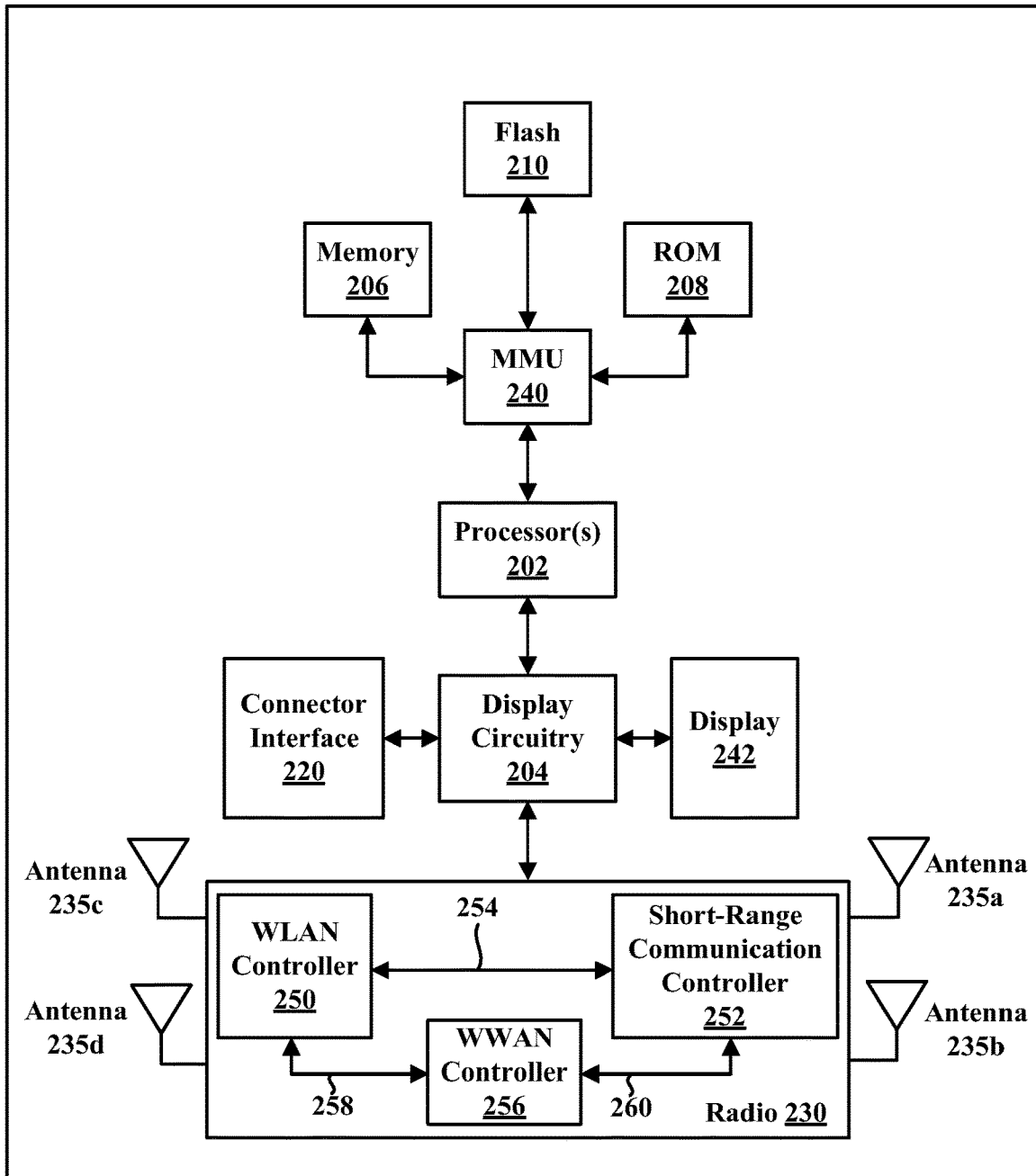
FIG. 2 is block diagram of a wireless device in accordance with certain aspects of the disclosure.

FIG. 2 is block diagram of a wireless device 200 in accordance with certain aspects of the disclosure. The wireless device 200 may correspond to, e.g., the central device 102, and/or one of peripheral devices 104, 106, 108, 110, 112, 114 described above in connection with FIG. 1. In certain aspects, the wireless device 200 may be a BLE enabled device. However, the disclosure is not intended to be limited to the wireless device 200 being a BLE enabled device. In some aspects, the wireless device 200 may be a BT Classic enabled device, an 802.15.4 Zigbee enabled or any wireless device configured to communicate via short-range communication protocols.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235a, 235b, 235c, 235d, for performing wireless communication with other BLE devices.

In certain aspects, the wireless device 200 may include hardware and software components (a processing element) configured to perform a soft combine operation after the decryption of data packets if the transmission and the re-transmission of data packets are encrypted using different nonces, e.g., using the techniques described below in connection with any FIGS. 3-13. The wireless device 200 may also comprise BLE firmware or other hardware/software for controlling BLE operations. In addition, the wireless device 200 may store and execute a wireless local area network (WLAN) software driver for controlling WLAN operations.

The wireless device 200 may be configured to implement part or all of the techniques described below in connection with any of FIGS. 3-13, e.g., by executing program instructions stored on a memory medium (e.g., a non-transitory computer-readable memory medium) and/or through hardware or firmware operation. In other embodiments, the techniques described below in connection with any of FIGS. 3-13 may be at least partially implemented by a programmable hardware element, such as a field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications and a short-range communications controller 252 configured to control short-range communications (e.g., BLE communications). A coexistence interface 254 (e.g., a wired interface) may be used for sending information between the WLAN controller 250 and the short-range communication controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communication controller 252 may be configured to implement a BLE protocol stack (see FIG. 3), and communicate with at least one second device using one or more of the antennas 235a, 235b, 235c, 235d. The short-range communication controller 252 may be configured to perform a soft combine operation after the decryption of data packets if the transmission and the re-transmission of data packets are encrypted using different nonces.

Figure 3:
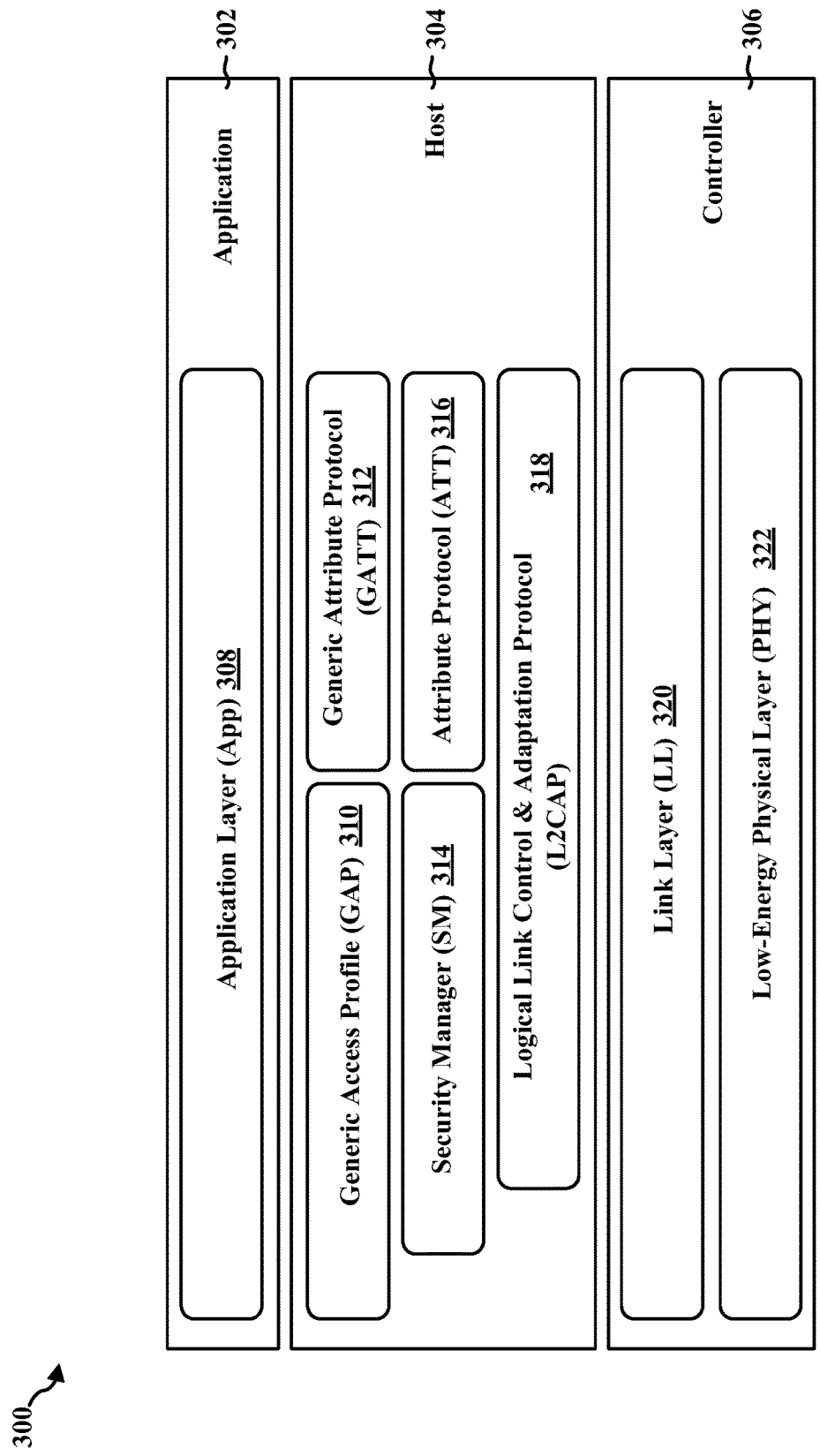
FIG. 3 is a diagram illustrating a modified BLE protocol stack in accordance with certain aspects of the disclosure.

FIG. 3 illustrates a BLE protocol stack 300 that may be implemented in a BLE device in accordance with certain aspects of the present disclosure. For example, the BLE protocol stack 300 may be implemented by, e.g., one or more of processor(s) 202, memory 206, Flash memory 210, ROM 208, the radio 230, and/or the short-range communication controller 252 illustrated in FIG. 2.

Referring to FIG. 3, the BLE protocol stack 300 may be organized into three blocks, namely, the Application block 302, the Host block 304, and the Controller block 306. Application block 302 may be a user application which interfaces with the other blocks and/or layers of the BLE protocol stack 300. The Host block 304 may include the upper layers of the BLE protocol stack 300, and the Controller block 306 may include the lower layers of the modified BLE protocol stack 300.

The Host block 304 may communicate with a BLE controller (e.g., short-range communication controller 252 in FIG. 2) in a wireless device using a Host Controller Interface (HCI) (not shown in FIG. 3). The HCI may also be used to interface the Controller block 306 with the Host block 304. Interfacing the Controller block 306 and the Host block 304 may enable a wide range of Hosts to interface with the Controller block 306.

The Application block 302 may include a higher-level Application Layer (App) 308, and the BLE protocol stack 300 may run under the App 308. The Host block 304 may include a Generic Access Profile (GAP) 310, a Generic Attribute Protocol (GATT) 312, a Security Manager (SM) 314, an Attribute Protocol (ATT) 316, and a Logical Link Control and Adaptation Protocol (L2CAP) 318. The Controller block 306 may include a LL 320 and a Physical Layer (PHY) 322.

The PHY 322 may define the mechanism for transmitting a bit stream over a physical link that connects BLE devices. The bit stream may be grouped into code words or symbols, and converted to a PDU that is transmitted over a transmission medium. The PHY 322 may provide an electrical, mechanical, and procedural interface to the transmission medium. The shapes and properties of the electrical connectors, the frequency band used for transmission, the modulation scheme, and similar low-level parameters may be specified by the PHY 322.

The LL 320 may be responsible for low level communication over the PHY 322. The LL 320 may manage the sequence and timing for transmitting and receiving data packets, and using a LL protocol, communicates with other devices regarding connection parameters and data flow control. The LL 320 may provide gate keeping functionality to limit exposure and data exchange with other devices. If filtering is configured, the LL 320 may maintain a list of allowed devices and ignore all requests for data exchange from devices not on the list. The LL 320 may also reduce power consumption. The LL 320 may use the HCI (not shown in FIG. 3) to communicate with upper layers of the BLE protocol stack 300. The LL 320 may include a third party's proprietary LL that may be used to discover peer devices (e.g., other devices associated with the third party), and establish a secure communication channel therewith.

In certain aspects, the LL 320 may be responsible for transporting data packets between devices in a WPAN. Each data packet may include a logical transport address LT_ADDR in a header field, which specifies the type of logical transport used to carry the data packet. Logical transports may exist between a master device and slave devices. Additionally, some logical transports may carry multiple logical links.

One type of logical transport is an ACL logical transport. The ACL logical transport may be used to carry data packets such as the data packet described below with reference to FIG. 4. Each device may receive a default ACL logical transport when the device joins the WPAN. Each ACL logical transport may carry one or more ACL communication links, which are distinguished by a Logical Link ID (LLID) field of the header. Retransmitted data packets carried via an ACL communication link may be received automatically if unacknowledged by the receiver device, allowing for correction of a radio link that is subject to interference. The ACL logical transport may permit communication of data for time-sensitive or time-bounded applications, such as streaming services, voice applications including Voice over Internet Protocol (VoW) and more standard, cellular telephone calls. Failing error correction, an erroneous data packet carried via an ACL communication link may be replaced with a special communication packet that in effect defines silence or packet loss concealment when the traditional BLE protocol is implemented. The special silence communication packet and/or packet loss concealment may reduce the communication quality experienced over ACL communication links because portions of the communications may be omitted (e.g., voice breaks during a voice call).

The L2CAP 318 may encapsulate multiple protocols from the upper layers into a data packet format (and vice versa). The L2CAP 318 may also break packets with a large data payload from the upper layers into multiple packets with the data payload segmented into smaller size data payloads that fit into a maximum payload size (e.g., 27 bytes) on the transmit side. Similarly, the L2CAP 318 may receive multiple data packets carrying a data payload that has been segmented, and the L2CAP 318 may combine the segmented data payload into a single data packet carrying the data payload that may be sent to the upper layers.

The ATT 316 may be a client/server protocol based on attributes associated with a BLE device configured for a particular purpose (e.g., monitoring heart rate, monitoring temperature, broadcasting advertisements, etc.). The attributes may be discovered, read, and written by peer devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE deice are performed. The SM 314 may provide additional cryptographic functions that may be used by other components of the BLE protocol stack 300. The architecture of the SM 314 used in BLE may be designed to minimize recourse requirements for peripheral devices by shifting work to an assumingly more powerful central device. BLE uses a pairing mechanism for key distribution. The SM 314 provides a mechanism to not only encrypt the data but also to provide data authentication.

The GATT 312 describes a service framework using the attribute protocol for discovering services, and for reading and writing characteristic values on a peer device. The GATT 312 interfaces with the App 308 through the App's profile. The App 308 profile defines the collection of attributes and any permission needed for the attributes to be used in BLE communications.

The GAP 310 may provide an interface for the App 308 to initiate, establish, and manage connection with counterpart BLE devices.

BLE provides for a method to transmit, and retransmit, a message until the receiving device decodes the message error free. Validation of a correctly received packet may be done through the use of CRC and/or Message Integrity Check (MIC). When packets are encrypted using AES-CCM, for example, the CRC is calculated on the encrypted packet. On the transmit side, when the CRC is generated and transmitted, the CRC is based on the encrypted data. In order for the CRC to be validated on the receive side, the encrypted data is analyzed by the receiver.

Incorrectly received packets may cause the packet to be retransmitted in response to a request for a new message (e.g., NACK) sent to the transmitting device by the receiving device. The transmitted packet and retransmitted packets may be soft combined until the receiving device can decode the message error free. However, if the same packet is encrypted using different cipher streams during the transmission and retransmission, then the retransmitted packet will not appear the same as the originally transmitted packet despite having the same payload.

For example, extended synchronous connection oriented (eSCO) packets are used for audio, and the eSCO packet transmission and each retransmission are each encrypted using a different nonce (e.g., counter). In addition, the cipher stream which encrypts the eSCO packet is also different. Soft combining is the process of combining received bits during different receptions in order to guess the correct bit. Soft combining eSCO packets will not work if the soft combining is performed before decryption because different nonces are used to encrypt the packet. If eSCO packets are soft combined after the packets are decrypted, then CRC validation cannot be performed directly on the corrected soft combined data because the CRC is calculated on the encrypted data. This thus presents the dilemma of how to validate the CRC. The packets have been decrypted to generate the corrected soft combined data, but validation of the CRC cannot be done on the decrypted data, validation of the CRC must occur on the encrypted data since the CRC has been calculated based on the encrypted data.

Thus, there exists a need for an error correction technique to validate the combination of transmitted and retransmitted decrypted data packets in BLE communications in situations where the transmitted and retransmitted packets are encrypted using different nonces and/or cipher streams.

The present disclosure provides an error correction technique to validate the combination of transmitted and retransmitted decrypted data packets that have been encrypted using different nonces and/or cipher streams. The error correction technique may be configured to validate the CRC (based on the encrypted data) against a CRC calculated on the data that has been decrypted and soft combined to generate the reconstructed data, but without re-encrypting the soft combined reconstructed data.

Figure 4:
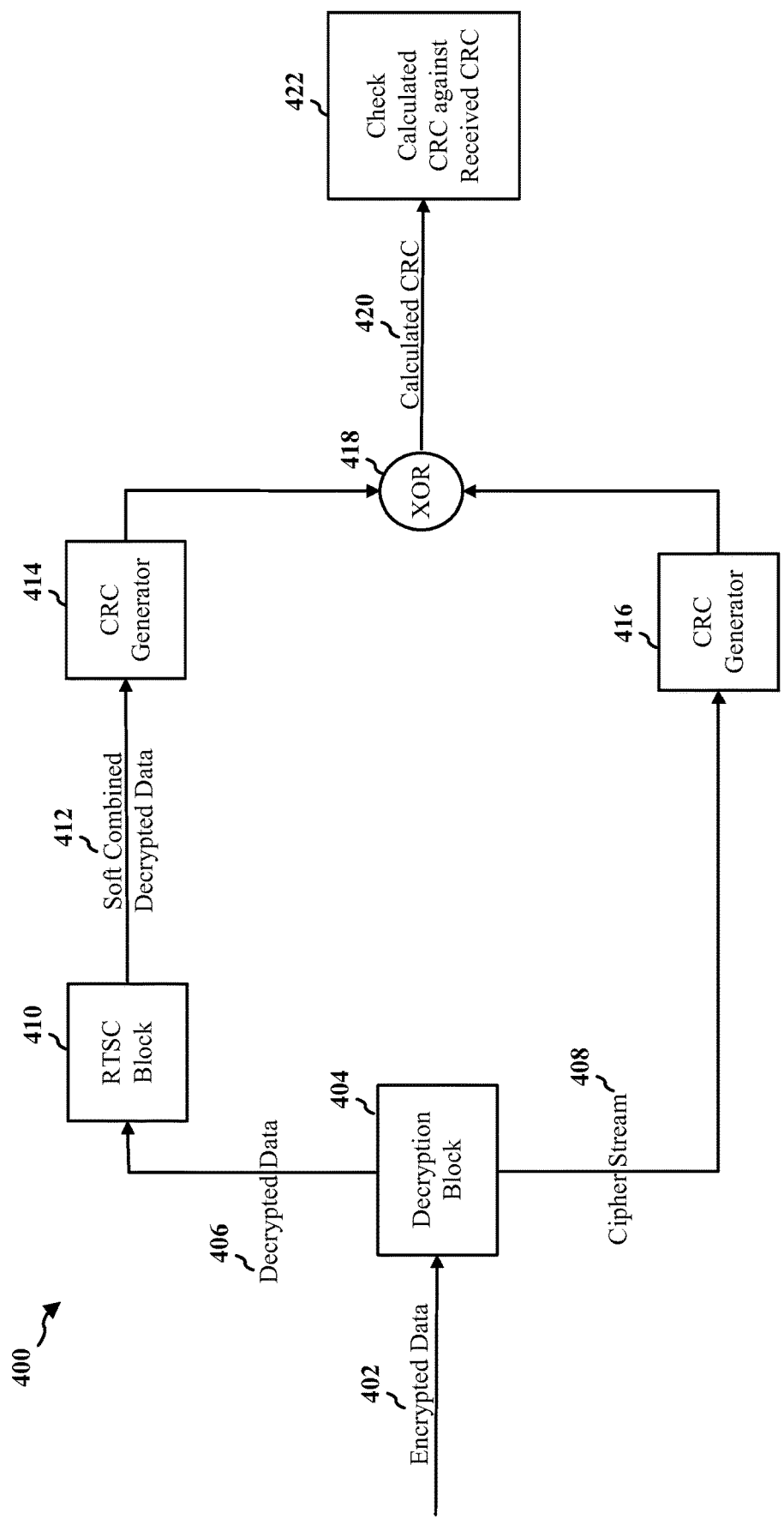
FIG. 4 is a block diagram illustrating a soft combining operation in accordance with certain aspects of the disclosure.
Figure 5:
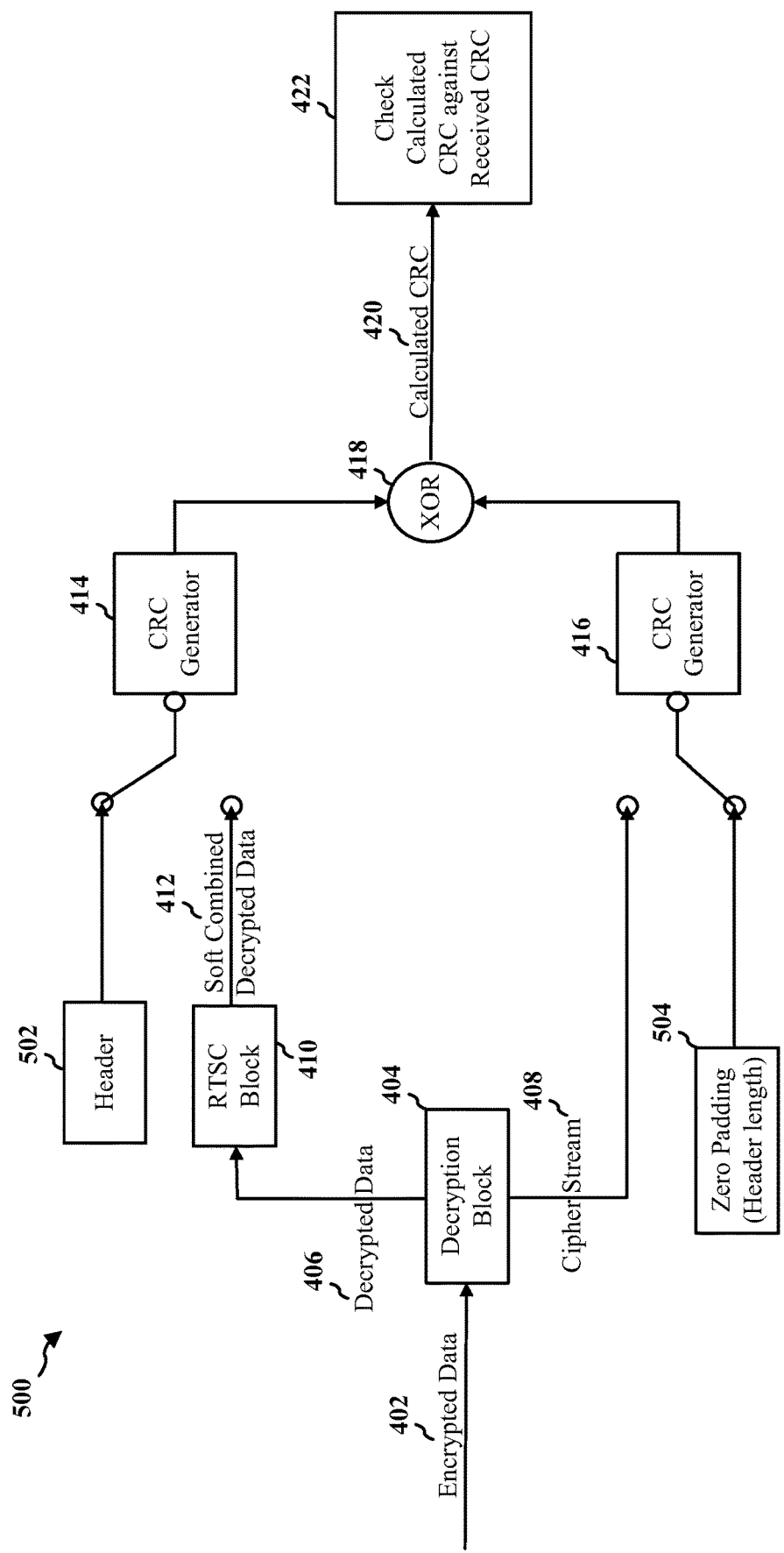
FIG. 5 is a block diagram illustrating a header adjustment in accordance with certain aspects of the disclosure.

FIG. 4 illustrates a block diagram 400 illustrating a soft combining operation in accordance with certain aspects of the present disclosure. FIG. 5 is a block diagram 500 illustrating a header adjustment in accordance with certain aspects of the disclosure. The soft combining operation may occur in communications between a first device and second device in a WPAN in accordance with certain aspects of the disclosure. The first device may correspond to, e.g., central device 102, peripheral device 104, 106, 108, 110, 112, 114, wireless device 200, the apparatus 902/902', or the mesh node 950. The second device may correspond to, e.g., central device 102, peripheral device 104, 106, 108, 110, 112, 114, wireless device 200, the apparatus 902/902', or the mesh node 950.

As seen in FIG. 4, the first device (e.g., transmitting device) may transmit encrypted data 402 to the second device (e.g., receiving device). The encrypted data 402 may include a first PDU and a first CRC that was calculated based on the encrypted first PDU. In some aspects, the first PDU may be encrypted based on a first nonce. The second device receives the encrypted data 402 provides the encrypted data 402 to the decryption block 404. The decryption block 404 decrypts the encrypted data 402 and outputs decrypted data 406 (e.g., first payload) and a cipher stream 408. The decryption block 404 is configured to generate the cipher stream 408 that was used to encrypt the encrypted data 402. The cipher stream 408 may also be used to decrypt the data.

The decryption block 404 outputs the decrypted data 406 to the real time soft combining (RTSC) block 410. In some aspects, the decrypted data 406 may be soft combined with a decrypted set of payloads at the RTSC block 410. The decrypted set of payloads may be encrypted based on at least one nonce that is different than the first nonce used to encrypt the first PDU. However, in some aspects, the decrypted set of payloads may be encrypted based on a nonce that is the same as the first nonce. The decrypted set of payloads may be previously received data packets that may be stored within the RTSC block 410 or may be stored in a memory that is external to the RTSC block 410. For example, the receiving device may receive a set of PDUs, prior to receiving the encrypted data 402, and may attempt to decrypt each PDU in the set of PDUs after the PDU is received to obtain a corresponding decrypted payload of the decrypted set of payloads. The receiving device may be configured to transmit a negative acknowledgement (NACK) in the event that the receiving device fails to properly validate a received CRC, based on the encrypted data, against a calculated CRC, based on the soft combined data. The transmission of the NACK from the receiving device to the transmitting device may indicate that the PDU was improperly received. In response to the NACK, the transmitting device sends another PDU to the receiving device. In some aspects, the retransmitted PDU may be the first PDU from the encrypted data 402.

The RTSC block 410 may be configured to soft combine the decrypted data 406 with previously received data in an effort to correct previous corrupt reception or improper reception of the same packet. The RTSC block 410 cannot operate on encrypted data because the encryption (e.g., nonce) changes from packet to packet, whereas decrypting the encrypted data 402 allows the RTSC block 410 to generate soft combined decrypted data 412 to reconstruct the data. However, as discussed above, BLE specifications require the CRC to be calculated on the encrypted data, not the decrypted data. The reconstructed data (e.g., soft combined decrypted data 412) generated by the RTSC block 410 is a combination of decrypted data, and a CRC calculated based on the decrypted data, alone, does not allow the first CRC based on the encrypted data to be validated. The first CRC based on the encrypted data needs to be validated to determine whether the soft combined decrypted data 412 has been properly received. Upon the determination that the soft combined decrypted data 412 has been properly received, the receiving device may send an acknowledgement (ACK) to the transmitting device. The ACK provides an indication to the transmitting device that the receiving device has properly received the PDU.

The RTSC block 410 outputs the soft combined decrypted data 412 to CRC generator 414. The CRC generator 414 is configured to generate a CRC based on the soft combined decrypted data 412. Although the CRC generated by the CRC generator 414 is a CRC based on decrypted data, this CRC may be utilized to calculate a CRC generated by the receiving device based on the reconstructed data without re-encrypting the reconstructed data. The CRC, generated by the CRC generator 414, based on the decrypted data may be further processed in order for the CRC to mimic as if it was generated based on encrypted data.

While the decryption block 404 is decrypting the encrypted data 402, the decryption block 404, in parallel, will output the cipher stream 408. The cipher stream 408 is outputted to the CRC generator 416, and may be configured to generate a CRC of only the cipher stream 408. The CRC of the cipher stream 408, generated by the CRC generator 416, may be used in conjunction with the CRC of the soft combined decrypted data 412, generated by the CRC generator 414, to generate a calculated CRC 420 which may then be used to validate the received CRC based on encrypted data (e.g., first CRC). The calculated CRC 420 may be based on the soft combined decrypted data 412 and based on the first cipher stream 408.

The disclosure takes advantage of the linear properties of CRC polynomials to further process the CRC generated by the CRC generator 414, based on the soft combined decrypted data, and to further process the CRC generated by the CRC generator 416, based on the cipher stream, to validate the CRC based on encrypted data. For example:

$$crc(x \oplus y) = crc(x) \oplus crc(y)$$

If x is the unencrypted data, and y is the cipher stream used to encrypt the data, then it follows that the CRC of the encrypted data will be equal to the XOR of the individual CRC of the decrypted data and the cipher stream. Thus:

$$CRC(\text{encrypted data}) = CRC(\text{decrypted data}) \oplus CRC(\text{cipher stream})$$

In BLE unencrypted data is encrypted by using the cipher stream. For example, XORing the unencrypted data with the cipher stream yields the encrypted data. The cipher stream may also be used to decrypt encrypted data. For example, XORing the encrypted data with the same cipher stream will result in the decrypted data. For example, in the expression $x \oplus y = z$ where x is unencrypted data, y is a cipher stream, and z is encrypted data, the unencrypted data x is encrypted by the cipher stream y by XORing the cipher stream and the unencrypted data, and results in encrypted data z. The cipher stream may be used to encrypt and decrypt data, in instances where the same cipher stream is used to perform both. In such instances, XORing the encrypted data z and the same cipher stream y, used to encrypt the unencrypted data x, would result in the decrypted data x, or as stated as follows if $x \oplus y = z$, then $z \oplus y = x$.

A CRC may be initialized with a seed, and both the transmitting device and the receiving device need to know the initial seed in order for the CRC (e.g., calculated CRC 420) to be correct. As such, the seed needs to be applied to one of the CRCs that is being generated by CRC generators 414, 416 in order for the calculated CRC 420 to be correct. In addition, the header also needs to be adjusted in order for the calculated CRC 420 to be correct when the CRC based on the soft combined decrypted data 412 is XORed with the CRC based on the cipher stream 408. In some aspects, a payload header 502 may be appended to the soft combined decrypted data 412 prior to the CRC generator 414 generating the CRC based on the soft combined decrypted data 412. In some aspects, the cipher stream 408 may be zero padded 504 prior to the CRC generator 416 generating the CRC based on the cipher stream 408. In yet some aspects, the payload header 502 may be appended to the soft combined decrypted data 412, and the first cipher stream 408 may be zero padded 504 prior to the calculated CRC 420 being generated. For example, as shown in FIG. 5, the decrypted data 406 is soft combined to reconstruct the correct data as it goes through the RTSC block 410, but the header does not run through the RTSC block 410. Instead, the header is provided to the payload header 502 after the data is decrypted by the decryption block 404. As the header portion is being processed by the decryption block 404, a cipher stream portion corresponding to the header portion is not generated by the decryption block 404 since the header is not encrypted. The header is provided to the payload header 502, and is provided to the CRC generator 414 prior to the soft combined decrypted data 412. As the payload header 502 is being provided to the CRC generator 414, the cipher stream 408 is not provided to the CRC generator 416. Instead, a zero padding stream 504 is provided to the CRC generator 416 that may be configured to correspond with the payload header 502 provided to the CRC generator 414. Once the payload header 502 has been fully received by the CRC generator 414, then a first switch may be toggled to form a connection with the output of the RTSC Block 410 and allow the soft combined decrypted data 412 to be fed into the CRC generator 414. Additionally, once the corresponding zero padding stream 504 has been fully received by the CRC generator 416, a second switch may then be toggled to form a connection with an output of the decryption block 404 corresponding to the cipher stream 408, to allow the cipher stream 408 to be fed into the CRC generator 416.

The length of the zero padding stream 504 may be equal to the length of the payload header 502. The length of the zero padding stream 504 may be equal to the length of the payload header 502 to ensure that when the generated CRC based on the soft combined decrypted data 412 is XORed with the generated CRC based on the cipher stream 408, the payload header 502 is XORed with the zero padding stream 504. Performing an XOR of the payload header 502 with the zero padding stream 504 will yield the payload header 502, and essentially mimics the header being encrypted with a cipher stream of all zeros. This will assist in ensuring that the calculated CRC 420 includes the correct header information, so that when the calculated CRC 420 is checked against the received CRC, at 422, the calculated CRC 420 can be validated. Validating the calculated CRC 420 indicates that the soft combined decrypted data 412 is correct, at which point, the receiving device may send an ACK back to the transmitting device.

At least one advantage of the disclosure is that the linear properties of CRC allows the header to be appended to either the soft combined decrypted data 412 or the cipher stream 408. For example, in some aspects, the header may be appended to the cipher stream 408 instead of the soft combined decrypted data 412. In such aspects, the header is provided to the CRC generator 416 prior to the cipher stream 408, and the zero padding stream is provided to the CRC generator 414 prior to the soft combined decrypted data 412. Once the header has been fully received by the CRC generator 416, the cipher stream 408 may be fed into the CRC generator 416. In addition, once the zero padding stream has been fully received by the CRC generator 414, the soft combined decrypted data 412 may be fed into the CRC generator 414. Prefixing the soft combined decrypted data 412 with the header before being fed into the CRC generator 414, and similarly prefixing the cipher stream 408 with the zero padding stream for the length equal to the header length provides the header adjustment to ensure that the calculated CRC 420 can be properly validated against the received CRC.

Referring back to FIG. 4, the CRC generator 414 outputs the generated CRC based on soft combined decrypted data 412 into the XOR block 418, and the CRC generator 416 outputs the generated CRC based on the cipher stream 408 into the XOR block 418. The result of the XOR between these two generated CRCs results in the calculated CRC 420. The XOR between the CRC of the soft combined decrypted data 412 and the CRC of the cipher stream 408 produces the CRC of the encrypted data, as discussed above. Since the encrypted data is the result of the unencrypted data XOR with the cipher stream, then it follows that the CRC of the encrypted data is the result of the CRC of the decrypted data XOR with the CRC of the cipher stream, where the CRC of the decrypted data is calculated based on decrypted data (e.g., soft combined decrypted data 412) which may be corrected decrypted data. Thus, XORing the CRC of the decrypted data and the CRC of the cipher stream may be configured to validate the calculated CRC 420 with the CRC of the encrypted data 402.

The calculated CRC 420 is outputted to CRC check box 422, where the calculated CRC 420 is compared against the received encrypted CRC (e.g., first CRC) to determine if the calculated CRC 420 passes a CRC check against the encrypted CRC. If the calculated CRC 420 passes a CRC check against the encrypted CRC (e.g., both being the same), then the encrypted data has been successfully combined such that the receiving device sends an ACK to the transmitting device. However, if the calculated CRC 420 is not the same as the encrypted CRC, then the encrypted data has not been successfully combined, and the receiving device may send a NACK to the transmitting device. At least one advantage of the disclosure is that the CRC of the soft combined decrypted data 412 may be utilized to validate the calculated CRC 420 without having to re-encrypt the data, which can enhance efficiency and reduce processing resources. At least another advantage of the disclosure is that if the encrypted data is not successfully combined and causes a NACK to be sent to the transmitting device, and another data packet being sent to the receiving device, the non-successfully combined data can be utilized by the RTSC block 410 to assist in generating the soft combined decrypted data 412. As discussed above, the decrypted data 406 may be soft combined with the decrypted set of payloads at the RTSC block 410. In some aspects, the decrypted set of payloads may be encrypted based on at least one nonce that is different than the first nonce used to encrypt the first PDU. However, in some aspects, the decrypted set of payloads may be encrypted based on a nonce that is the same as the first nonce. While in some aspects, the decrypted set of payloads may be previously received data packets.

Figure 6:
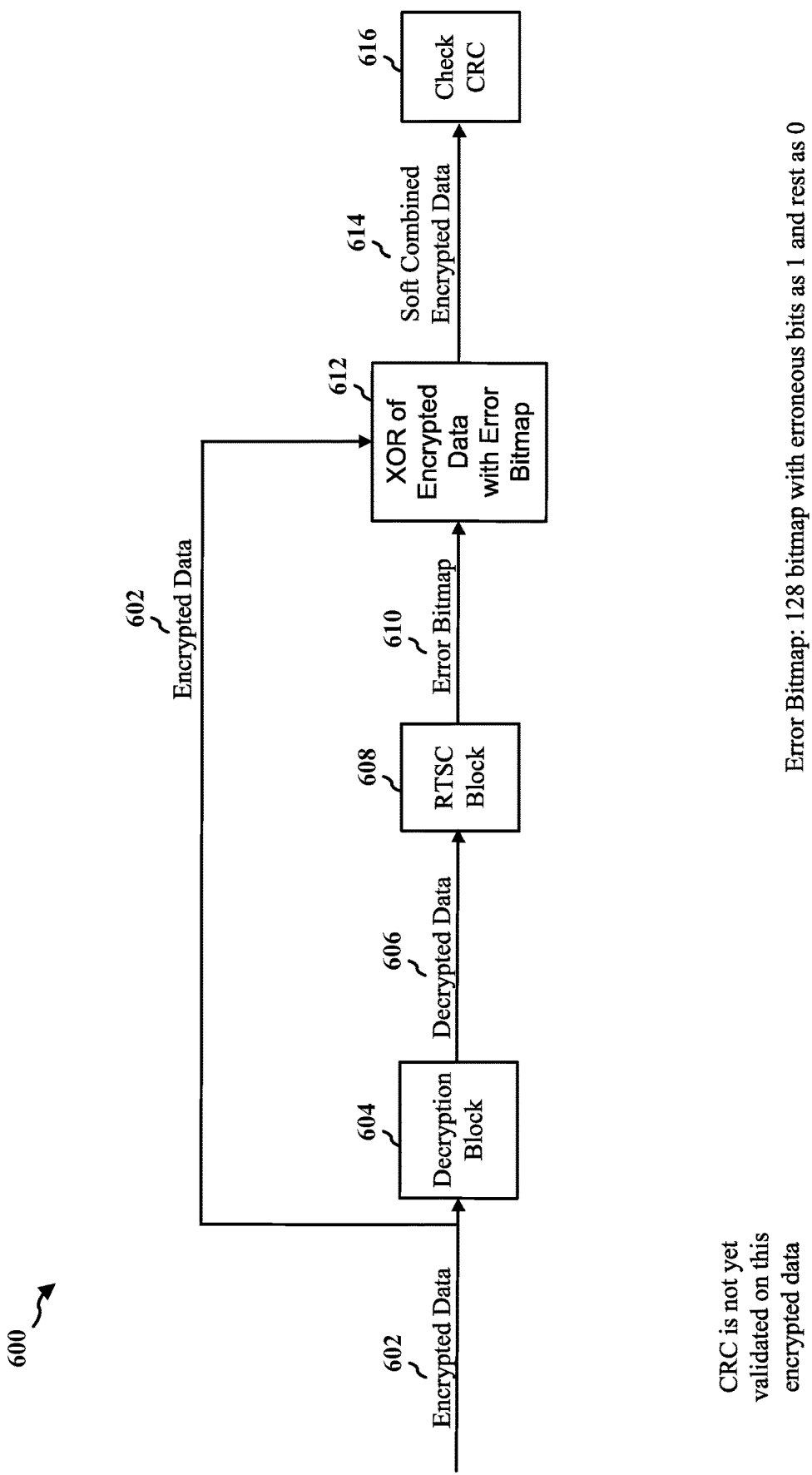
FIG. 6 is a block diagram illustrating another soft combining operation in accordance with certain aspects of the disclosure.

FIG. 6 illustrates a block diagram 600 illustrating an aspect of a soft combining operation in accordance with certain aspects of the present disclosure. The aspect of FIG. 6 leverages the Advanced Encryption Standard (AES) encryption property that if some bits of an encrypted packet got flipped due to over-the-air corruption and if the corrupted packet is decrypted with the correct cipher stream, then the decrypted packet will have the same erroneous bits as the corrupted encrypted packet.

The soft combing operation of FIG. 6 may occur in communications between a first device and a second device in a WPAN in accordance with certain aspects of the disclosure. The first device may correspond to, e.g., central device 102, peripheral device 104, 106, 108, 110, 112, 114, wireless device 200, the apparatus 902/902', or the mesh node 950. The second device may correspond to, e.g., central device 102, peripheral device 104, 106, 108, 110, 112, 114, wireless device 200, the apparatus 902/902', or the mesh node 950.

With reference to FIG. 6, the first device (e.g., transmitting device) may transmit encrypted data 602 to the second device (e.g., receiving device). The encrypted data 602 may be similar to encrypted data 402 of FIG. 4. The encrypted data 602 may include a first PDU and a first CRC that was calculated based on the encrypted first PDU. In some aspects, the first PDU may be encrypted based on a first nonce. The second device receives the encrypted data 602 and the encrypted data 602 is provided to the decryption block 604. The decryption block 604 may be configured in a manner similar to the decryption block 404 of FIG. 4. The decryption block 604 decrypts the encrypted data 602 (e.g., first PDU) and outputs decrypted data 606 (e.g., first payload).

The decryption block 604 outputs the decrypted data 606 to a RTSC block 608. In some aspects, the decryption block 604 may be configured to provide the decrypted data 606 to the RTSC block 608 in a packet of 128 bits. The RTSC block 608 may be configured in a manner similar to the RTSC block 410. In some aspects, the decrypted data 606 may be soft combined with a decrypted set of payloads at the RSTC block 608. In some aspects, the set of payloads have been encrypted based on at least one nonce that is different than the first nonce. However, in some aspects, the set of payload may be encrypted based on a nonce that is the same as the first nonce. In some aspects, the decrypted set of payloads may be previously received data packets that may be stored within the RTSC block 608 or may be stored in a memory that is external to the RTSC block 608. For example, the receiving device may receive a set of PDUs, prior to receiving the encrypted data 602, and may attempt to decrypt each PDU in the set of PDUs after the PDU is received to obtain a corresponding decrypted payload of the decrypted set of payloads. The receiving device may be configured to transmit a NACK in the event that the receiving device fails to properly validate a received CRC, based on the encrypted data, against a calculated CRC, based on the soft combined data. The transmission of the NACK from the receiving device to the transmitting device may indicate that the PDU was improperly received. In response to the NACK, the transmitting device sends another PDU to the receiving device. In some aspects, the retransmitted PDU may be the first PDU from the encrypted data 602.

The RTSC block 608 may be configured to soft combine the decrypted data 606 with the decrypted set of payload in order to reconstruct the data and generate an error bitmap 610. In some aspects, additional information may be soft combined with the decrypted data 606, such as but not limited to, previous corrupted receptions of the same packet and/or soft bit information from modem. The RTSC block 608 will output the reconstructed decrypted data along with the error bitmap 610 which may be a list of the bits which were erroneous e.g., bits that got flipped due to over-the-air corruption. In some aspects, the reconstructed data and/or the erroneous bitmap may be 128 bits long. The error bitmap may be arranged to track which bits may have flipped or are erroneous when the RTSC block 608 is soft combining the decrypted data 606.

The RSTC block 608 outputs the error bitmap 610 to the XOR block 612. The XOR block 612 also receives an input of the encrypted data 602. The XOR block 612 XORs the encrypted data 602 (e.g., first PDU) with the generated error bitmap 610 to obtain a soft combined encrypted data 614. A CRC is generated based on the soft combined encrypted data 614 and is then submitted to Check CRC box 616. The Check CRC box 616 determines whether the CRC generated based on the soft combined encrypted data 614 passes a CRC check against the first CRC of the encrypted data 602. If the CRCs match then the data after the soft combining is valid, and the receiving device sends an ACK to the transmitting device, indicating that the packet has been properly received. However, if the CRC based on the soft combined encrypted data 614 does not pass the CRC check at Check CRC box 616, then the soft combined encrypted data 614 has not been successfully combined, and the receiving device may send a NACK to the transmitting device. At least one advantage of the disclosure is that the aspect of FIG. 6 generates a CRC based on the soft combined encrypted data 614, which is consistent with the BLE requirements. Yet another advantage of the disclosure is that the aspect of FIG. 6 yields the same results as the aspect of FIG. 4, because it is mathematically equivalent to the aspect of FIG. 4.

Figure 7:
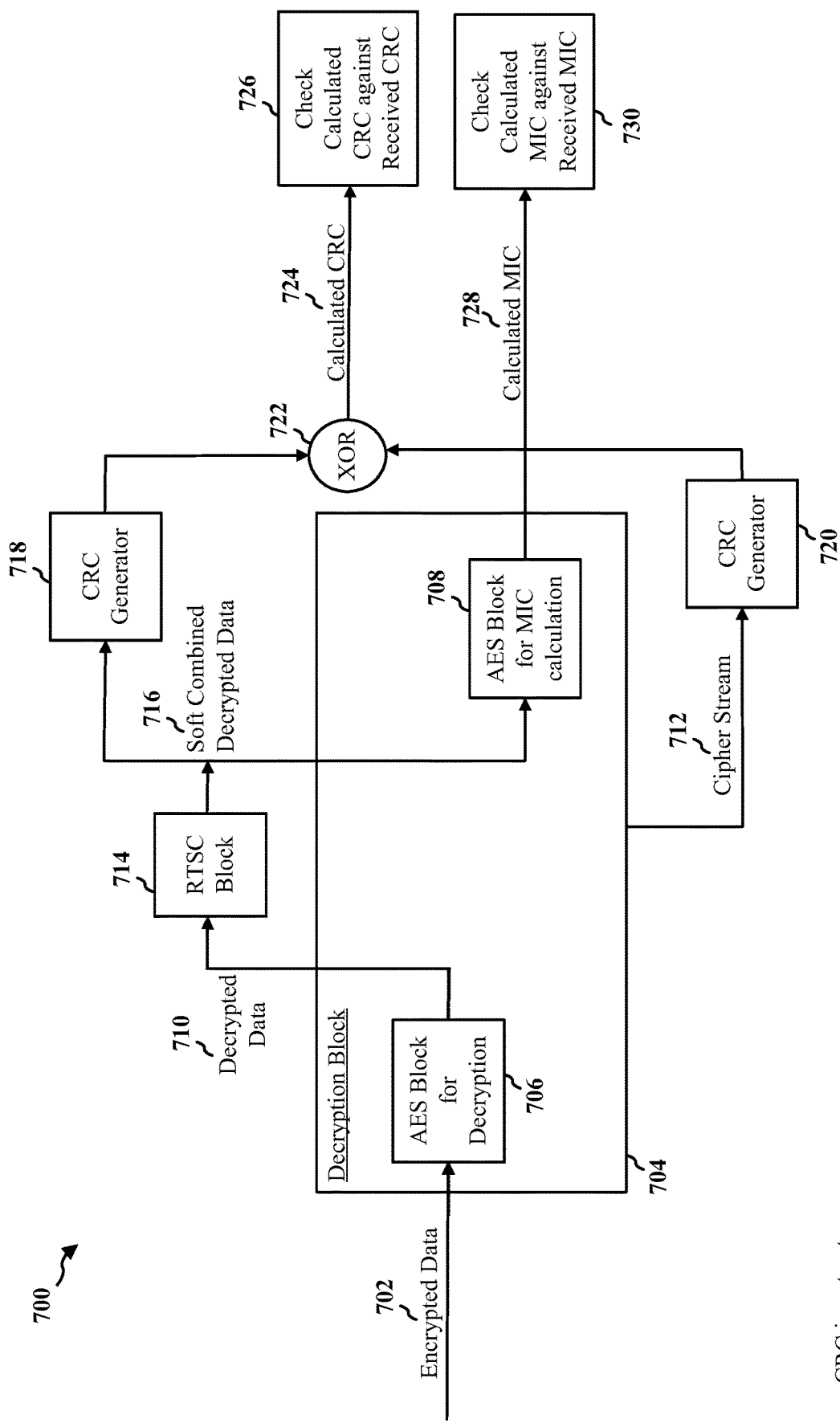
FIG. 7 is a block diagram illustrating a MIC calculation operation in accordance with certain aspects of the disclosure.

FIG. 7 illustrates a block diagram 700 illustrating an aspect of a message integrity check (MIC) calculation operation in accordance with certain aspects of the present disclosure. A MIC includes information that may be used to authenticate a data packet. The MIC may be used by the receiving device to confirm that the received data came from a stated transmitting device (e.g., data packet authenticity), and to confirm that a payload has not been changed (e.g., data packet integrity). The MIC protects both payload integrity and the authenticity of the data packet by enabling a receiving device to detect any changes to the payload. The block diagram 700 is similar, in part, to the block diagram 400 of FIG. 4, and has many similar components that operate in a manner similar to the corresponding components of FIG. 4, such as but not limited to an RTSC block, a CRC generator that generates a CRC based on soft combined decrypted data, a CRC generator that generates a CRC based on the cipher stream, and that a calculated CRC is checked against the received CRC. However, the block diagram 700 may be configured to calculate the MIC based on the decrypted data and is validated against the received MIC included in the encrypted data 702. A discussion of the similar components of block diagrams 400 and 700 is not included herein in an effort to reduce duplicative work. The discussion of FIG. 7 will be directed towards the additional components and/or features that are not present in the diagram 400 of FIG. 4.

As shown in FIG. 7, the transmitting device transmits the encrypted data 702 to the receiving device. The encrypted data 702 is provided to the decryption block 704. The decryption block 704 may be configured to generate the decrypted data 710 from the encrypted data 702. In some aspects, the decryption block 704 may comprise an AES decryption block 706 that generates the decrypted data 710 from the encrypted data 702. The AES decryption block 706 receives the encrypted data 702 and generates the decrypted data 710, which is outputted from the decryption block 704 into the RTSC block 714. The disclosure is not intended to be limited to a decryption block comprising the AES decryption block. In some aspects, the decryption block 704 may be comprised of many different known encryption/decryption blocks. The RTSC block 714 may be configured in a manner similar to the RTSC block 410 of FIG. 4. The RTSC block 714 receives the decrypted data 710 and may be soft combined with a decrypted set of payloads at the RTSC block 714, in a manner similar to the RTSC block 410. The decrypted set of payloads may be encrypted based on at least one nonce that is different than the first nonce used to encrypt the first PDU. However, in some aspects, the set of payload may be encrypted based on a nonce that is the same as the first nonce. The decrypted set of payloads may be previously received data packets that may be stored within the RTSC block 714 or may be stored in a memory that is external to the RTSC block 714. For example, the receiving device may receive a set of PDUs, prior to receiving the encrypted data 702, and may attempt to decrypt each PDU in the set of PDUs after the PDU is received to obtain a corresponding decrypted payload of the decrypted set of payloads.

The RTSC block 714 may be configured to soft combine the decrypted data 710 with previously received data in an effort to correct previous corrupt reception or improper reception of the same packet, similarly as discussed above for RTSC block 410. The RTSC block 714 generates reconstructed data (e.g., soft combined decrypted data 716) and output the soft combined decrypted data 716 to the CRC generator 718, also in a manner similar to the RTSC block 410. However, the RTSC block 714 further outputs the soft combined decrypted data 716 back to the decryption block 704 to calculate the MIC. In some aspects, the decryption block 704 may further comprise an AES MIC calculation block 708 for MIC calculation. The AES MIC calculation block 708 generates a calculated MIC 728 based on the corrected data (e.g., soft combined decrypted data 716). The disclosure is not intended to be limited to a MIC calculation block comprising the AES MIC calculation block 708. In some aspects, the MIC calculation block may be comprised of many different known MIC calculation blocks. At block 730, the calculated MIC 728 is checked against the received MIC from within the encrypted data 702. If the calculated MIC 728 is the same as the received MIC from the encrypted data 702, then the soft combined decrypted data 716 is validated as being correct, such that the contents of the packet have not changed in the transmission from the transmitting device to the receiving device. However, if the calculated MIC 728 is not the same as the received MIC, then the soft combined decrypted data 716 may not be properly corrected by the RTSC block 714 and the calculated MIC 728 fails. In some aspects, if the calculated MIC fails, then something may have occurred with the link between the transmitting device and the receiving device resulting in one or more bits getting flipped.

The calculated MIC 728 may be configured to be validated in instances when the calculated CRC passes the CRC check against the CRC received from the transmitting device. Validating the calculated MIC 728 when the calculated CRC passes the CRC check ensures that the calculated MIC 728 is calculated based on corrected data (e.g., soft combined decrypted data) generated by the RTSC block. Thus, validating the calculated MIC 728 occurs after the calculated CRC has been validated.

Figure 8:
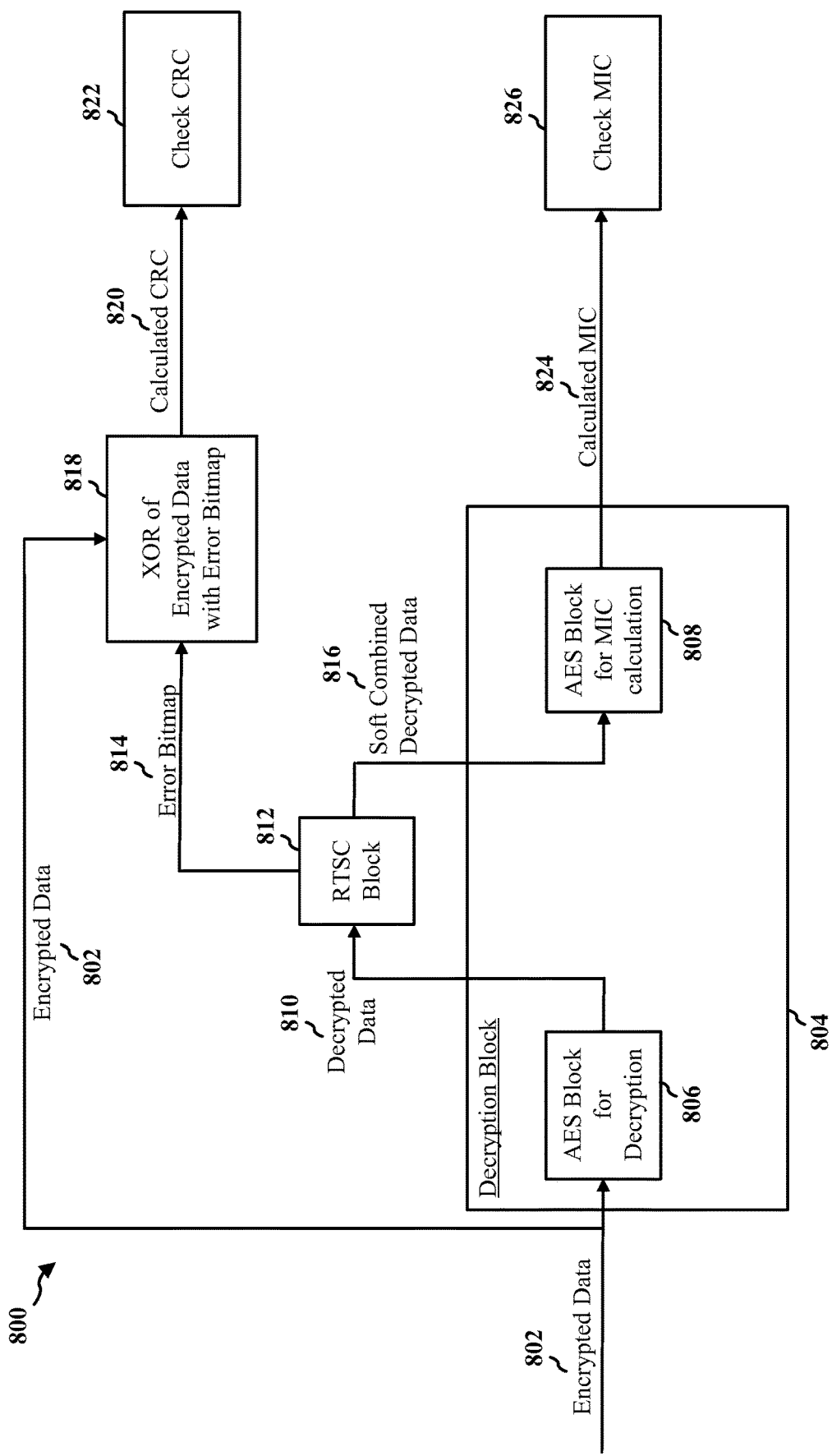
FIG. 8 is a block diagram illustrating another MIC calculation operation in accordance with certain aspects of the disclosure.

FIG. 8 illustrates a block diagram 800 illustrating an aspect of a MIC calculation operation in accordance with certain aspects of the present disclosure. The block diagram 800 is similar, in part, to the block diagram 600 of FIG. 6, and has many similar components that operate in a manner similar to the corresponding components of FIG. 6, such as but not limited to an RTSC block that generates an error bitmap, an XOR block that XORs encrypted data and the error bitmap to generate a calculated CRC. The block diagram 800 may be configured to calculate the MIC based on the decrypted data, similarly as the diagram 700 of FIG. 7, and is validated against the received MIC included in the encrypted data 802. A discussion of the similar components of block diagrams 600 and 800 is not included herein in an effort to reduce duplicative work. The discussion of FIG. 8 may be directed towards the additional components and/or features that are not present in the diagram 600.

As shown in FIG. 8, the transmitting device transmits the encrypted data 802 to the receiving device. The encrypted data 802 is provided to the decryption block 804. The decryption block 804 may be configured to generate the decrypted data 810 from the encrypted data 802. In some aspects, the decryption block 804 comprises an AES decryption block 806 that generates the decrypted data 810 from the encrypted data 802. The AES decryption block 806 receives the encrypted data 802 and generates the decrypted data 810, which is outputted from the decryption block 804 into the RTSC block 812. The disclosure is not intended to be limited to a decryption block comprising the AES decryption block. In some aspects, the decryption block 804 may be comprised of many different known encryption/decryption blocks. The RTSC block 812 may be configured in a manner similar to the RTSC block 608 of FIG. 6. The RTSC block 812 receives the decrypted data 810 and generates an error bitmap 814 that is provided to the XOR block 818 which generates a calculated CRC 820 based on the XOR of the error bitmap 814 and the encrypted data 802.

The RSTC block 812 may be further configured to generate a soft combined decrypted data stream 816 that is fed back into the decryption block 804 to calculate the MIC. In some aspects, the decryption block 804 may further comprise an AES MIC calculation block 808 for MIC calculation. The AES MIC calculation block 808 generates a calculated MIC 824 based on the corrected data (e.g., soft combined decrypted data 816). The disclosure is not intended to be limited to a MIC calculation block comprising the AES MIC calculation block 808. In some aspects, the MIC calculation block may be comprised of many different known MIC calculation blocks. At block 826, the calculated MIC 824 is checked against the received MIC from within the encrypted data 802. If the calculated MIC 824 is the same as the received MIC from the encrypted data 802, then the soft combined decrypted data 816 is validated as being correct, such that the contents of the packet have not changed in the transmission from the transmitting device to the receiving device. However, if the calculated MIC 824 is not the same as the received MIC, then the soft combined decrypted data 816 may not be properly corrected by the RTSC block 812 and the calculated MIC 824 fails. As in the diagram 700 of FIG. 7, the calculated MIC 824 may be configured to be validated in instances when the calculated CRC passes the CRC check against the CRC received from the transmitting device. Validating the calculated MIC 824 when the calculated CRC passes the CRC check assists in ensuring that the calculated MIC 824 is calculated based on the corrected data (e.g., soft combined decrypted data 816)

generated by the RTSC block. As such, validation of the calculated MIC 824 occurs after the calculated CRC has been first validated.

Figure 9:
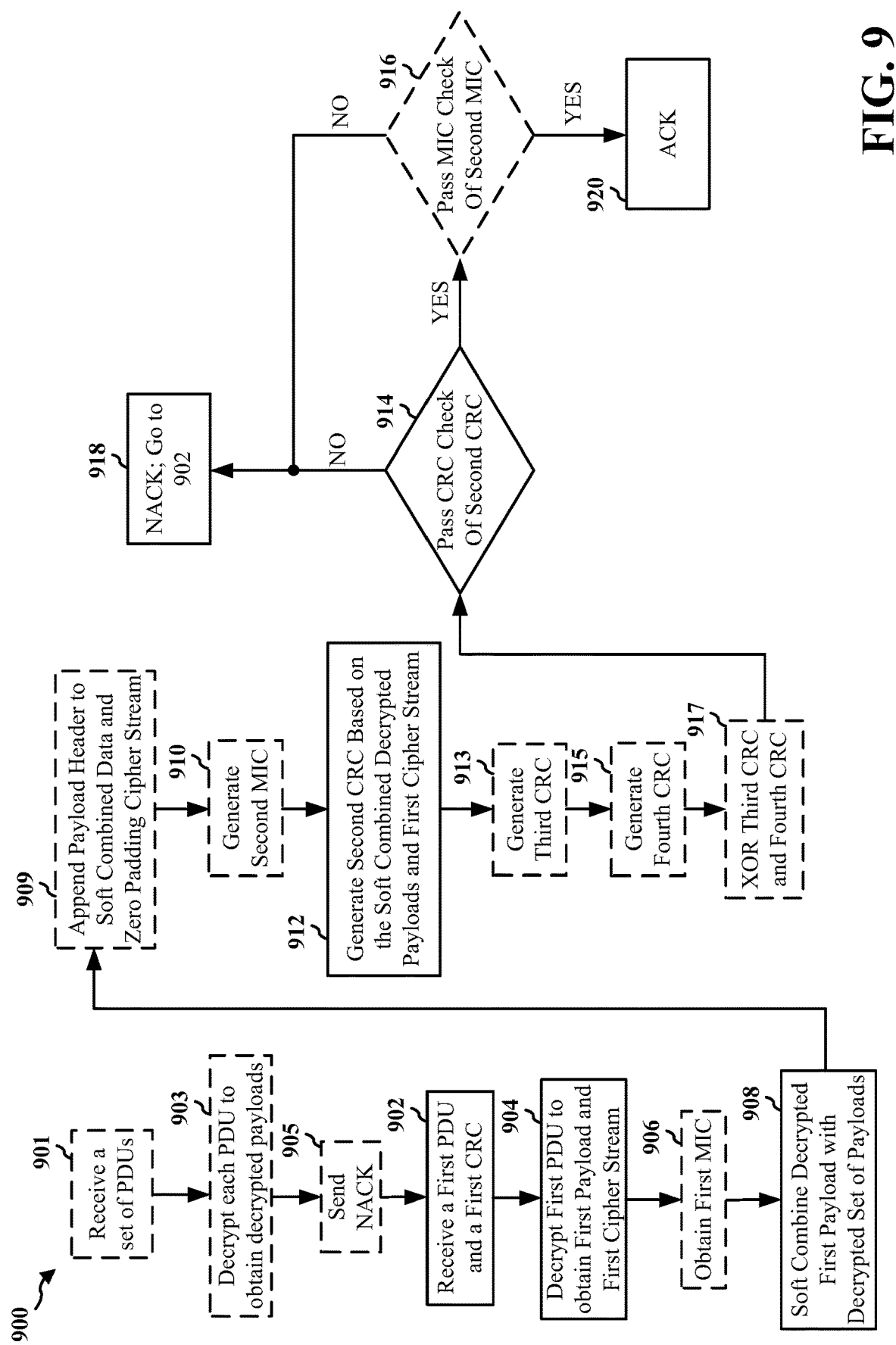
FIG. 9 is a flowchart of a method of wireless communication.

FIG. 9 is a flowchart 900 of a method of wireless communication. The method may be performed by a first device (e.g., the central device 102, peripheral device 104, 106, 108, 110, 112, 114, wireless device 200, the apparatus 1002/1002') in communication with a second device (e.g., central device 102, peripheral device 104, 106, 108, 110, 112, 114, wireless device 200). In FIG. 9, optional operations are indicated with dashed lines.

Referring to FIG. 9, at 901, the first device may receive a set of PDUs, as discussed in reference to FIGS. 4, 5, and 7. At 903, the first device may decrypt, at decryption block 404, 704, each PDU in the set of PDUs after the PDU is received to obtain a corresponding decrypted payload of the decrypted set of payloads, as discussed in reference to FIGS. 4, 5, and 7. At 905, the first device may be configured to send a NACK after failing to properly validate a received CRC, based on the encrypted data, against a calculated CRC, based on the soft combined data. In such aspects, the first device sending the NACK may indicate that the PDU was improperly received by the first device. In some aspects, a first PDU (e.g., encrypted data 402, 702) may be received based on the sent NACK.

At 902, the first device may receive the first PDU (e.g., encrypted data 402, 702) and a first CRC that is based on the first PDU. In some aspects, as discussed in reference to FIGS. 4, 5 and 7, the first PDU (e.g., encrypted data 402, 702) may be encrypted based on a first nonce.

At 904, the first device may decrypt, at decryption block 404, 704, the first PDU (e.g., encrypted data 402, 702) to obtain a first payload (e.g., decrypted data 406, 710) and a first cipher stream (e.g., cipher stream 408, 712). For example, with reference to FIGS. 4, 5 and 7, the decryption block 404, 704 receives the encrypted data 402, 702 and generates the decrypted data 406, 710 and a cipher stream 408, 712. At 906, the first device may be configured to decrypt the first PDU, at decryption block 704, to obtain a first message integrity check (MIC).

At 908, the first device may be configured to soft combine the decrypted first payload with a decrypted set of payloads. For example, the RTSC block 410, 714 may be configured to real time soft combine the decrypted data 406, 710 with a decrypted set of payloads. In some aspects, the decrypted set of payloads may comprise previously received decrypted data packets, as discussed above in reference to 903. In some aspects, the set of payload may have been encrypted based on at least one nonce different than the first nonce. However, in some aspects, the set of payload may be encrypted based on a nonce that is the same as the first nonce. At 909, the first device may be configured to append a payload header (e.g., payload header 502) to the soft combined decrypted payloads (e.g., soft combined decrypted data 412, 716) and zero padding (e.g., zero padding stream 504) the first cipher stream (e.g., cipher stream 408, 712) before generating a second CRC (e.g., calculated CRC 420, 724).

At 910, the first device may be further configured to generate a second MIC (e.g., calculated MIC 728 of FIG. 7) based on the soft combined decrypted payloads (e.g., soft combined decrypted payloads 716).

At 912, the first device may be configured to generate a second CRC (e.g., calculated CRC 420, 724) based on the soft combined decrypted payloads (e.g., soft combined decrypted payloads 412, 716) and based on the first cipher stream (e.g., cipher stream 408, 712). In some aspects, for example at 913, to generate the second CRC (e.g., calculated CRC 420, 724) the first device may be configured to generate a third CRC, at CRC generator 414, 718, based on the soft combined decrypted payloads (e.g., soft combined decrypted data 412, 716). In some aspects, for example at 915, the first device may be further configured to generate a fourth CRC, at CRC generator 416, 720, based on the first cipher stream (e.g., cipher stream 408, 712). In some aspects, for example at 917, the first device may be configured to XOR, at XOR 418, 722, the third CRC and the fourth CRC to obtain the second CRC (e.g., calculated CRC 420, 724). In some aspects, the first device may be configured to append a header (e.g., header payload 502) to the soft combined decrypted payloads (e.g., soft combined decrypted data 412, 716) before generating the third CRC, at CRC generator 414, and zero padding (e.g., zero padding stream 504) the first cipher stream (e.g., cipher stream 408, 712) before generating the fourth CRC, at CRC generator 416, 720.

At 914, the first device may determine whether the generated second CRC (e.g., calculated CRC 420, 724) for the soft combined decrypted payloads passes a CRC check (e.g., block 422, 726) against the first CRC. If the generated second CRC does not pass the CRC check, then at 918, a NACK is sent by the first device to the second device, which results in a retransmission of the PDU and the process is repeated starting at 902. If the generated second CRC does pass the CRC check, then at 916, the first device may determine whether the generated second MIC (e.g., calculated MIC 728) passes a MIC check (e.g., MIC check 730) against the first MIC. If the generated second MIC does not pass the MIC check, then at 918, a NACK is sent by the first device to the second device, which may result in the retransmission of the PDU and the process is repeated starting at 902. If the generated second MIC does pass the MIC check, then at 920, the first device may transmit an ACK to the second device. The transmission of an ACK to the second device indicates that the PDU was properly received, such that the soft combined decrypted data 412, 716 was properly combined.

Figure 10:
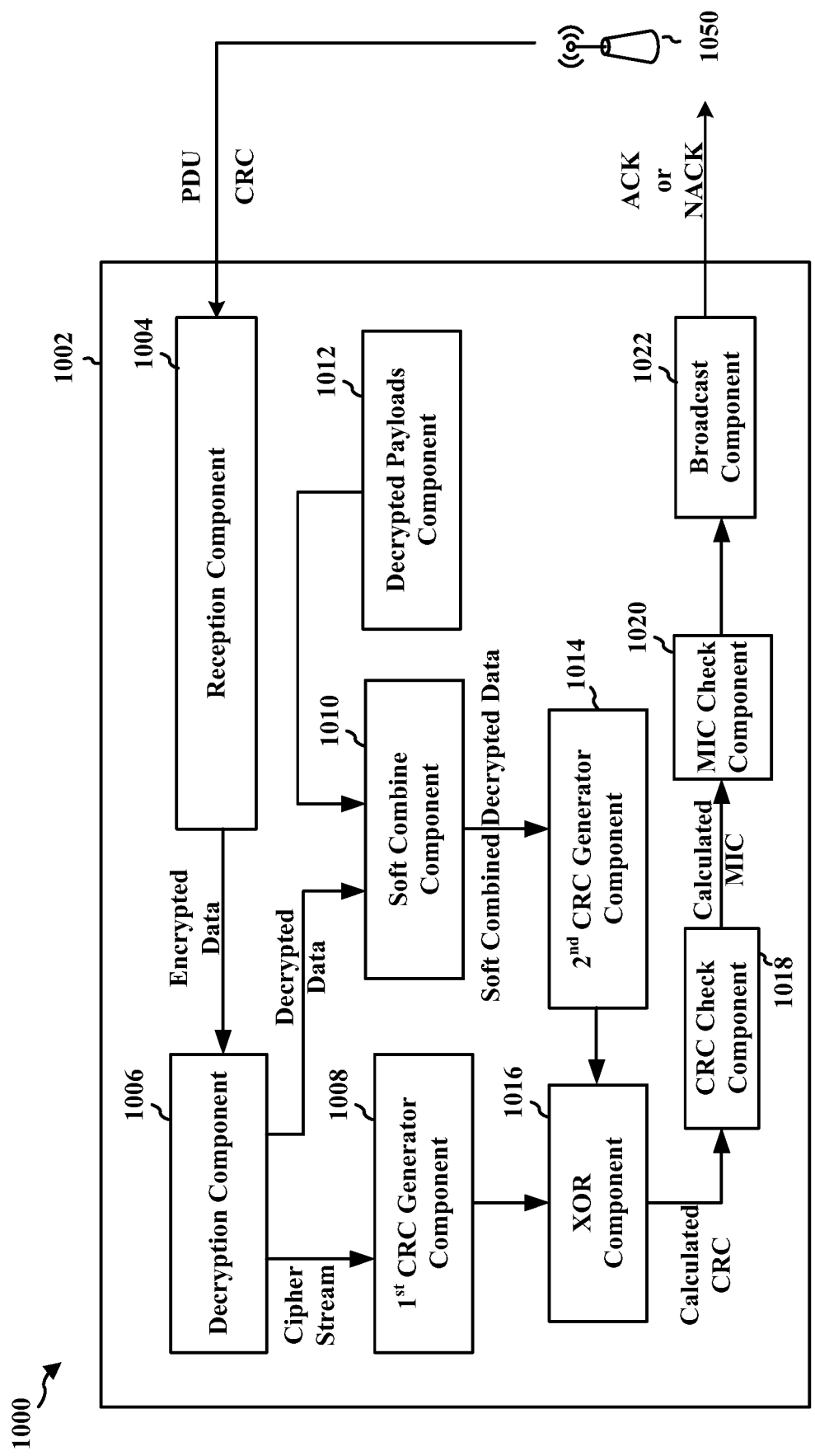
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a first device (e.g., central device 102, peripheral device 104, 106, 108, 110, 112, 114, wireless device 200, the apparatus 1002') in communication with a second device (e.g., central device 102, peripheral device 104, 106, 108, 110, 112, 114, wireless device 200). The apparatus may include a reception component 1004, a decryption component 1006, a first CRC generator component 1008, a soft combine component 1010, a decrypted payloads component 1012, a second CRC generator component 1014, an XOR component 1016, a CRC check component 1018, and a broadcast component 1020.

The reception component 1004 may be configured to receive a first PDU and a first CRC that is based on the first PDU from the second device 1050. In some aspects, the first PDU (e.g., encrypted data 402) may be encrypted based on a first nonce. In some aspects, the first device may receive a set of PDUs, and decrypt, at decryption block 404, each PDU in the set of PDUs after the PDU is received to obtain a corresponding payload of the decrypted set of payloads, as discussed in reference to FIGS. 4, 5 and 7. In some aspects, the first device may be configured to send a NACK after failing to properly validate, at block 422, 726, a received CRC, based on the encrypted data, against a calculated CRC, based on the soft combined data. In such aspects, the first device sending the NACK may indicate that the PDU was improperly received by the first device. In some aspects, the first PDU (e.g., encrypted data 402, 702) may be received based on the sent NACK.

The decryption component 1006 may be configured to receive the encrypted data 402, 702 (e.g., first PDU) from the reception component 1004 and decrypt the first PDU to obtain a first payload and a first cipher stream. For example, with reference to FIGS. 4, 5, and 7, the decryption block 404, 704 receives the encrypted data 402, 702 and generates the decrypted data 406, 710 and a cipher stream 408, 712. In some aspects, the decryption component 1006 may be configured to decrypt the first PDU, by decryption block 704, to obtain a first message integrity check (MIC). In some aspects, the decryption component 1006 may be configured to generate a second MIC (e.g., calculated MIC 728 of FIG. 7) based on the soft combined decrypted payloads (e.g., soft combined decrypted payloads 716).

The first CRC generator component 1008 may be configured to receive the cipher stream 408, 712 from the decryption component 1006 and generate, at CRC generator 416, 720, a CRC based on the cipher stream 408, 712. The soft combine component 1010 may be configured to soft combine, at RTSC block 410, 714, the decrypted first payload (e.g., decrypted data 406, 710) with a decrypted set of payloads. The decrypted payloads component 1012 may be configured to store a set of payloads that have been encrypted based on at least one nonce different than the first nonce and provide the set of payloads to the soft combine component 1010. However, in some aspects, the set of payload may be encrypted based on a nonce that is the same as the first nonce. In some aspects, the decrypted set of payloads may comprise previously received decrypted data packets.

The second CRC generator component 1014 may be configured to receive the soft combined decrypted data from the soft combine component and generate a CRC, at CRC generator 414, 718, based on the soft combined decrypted data 412, 716. The XOR component 1016 may be configured to receive the CRC generated by the first CRC generator component 1008 and the CRC generated by the second CRC generator component 1014 to generate a second CRC (e.g., calculated CRC 420, 724) based on the soft combined decrypted payloads (e.g., soft combined decrypted payloads 412, 716) and based on the first cipher stream (e.g., cipher stream 408, 712). In some aspects, a payload header (e.g., payload header 502) may be appended to the soft combined decrypted payloads (e.g., soft combined decrypted data 412, 716) and zero padding (e.g., zero padding stream 504) may be appended to the first cipher stream (e.g., cipher stream 408, 712) before generating the second CRC (e.g., calculated CRC 420, 724).

The CRC check component 1018 may be configured to determine whether the generated second CRC (e.g., calculated CRC 420, 724) for the soft combined decrypted payloads passes a CRC check (e.g., block 422, 726) against the first CRC. The MIC check component 1020 may be configured to determine whether the calculated MIC (e.g., calculated MIC 728) passes a MIC check (e.g., block 730) against the first MIC. The broadcast component 1022 may be configured to transmit an ACK or a NACK to the second device 1050 based on whether the generated second CRC (e.g., calculated CRC 420, 724) for the soft combined decrypted payloads passes a CRC check and/or whether the calculated MIC 728 passes a MIC check against the MIC received with the encrypted data. For example, if the calculated CRC 420, 724 passes the CRC check, then the broadcast component 1022 may transmit an ACK to the second device 1050 indicating that the PDU was properly received. In other aspects, if the calculated CRC 420 does not pass the CRC check, then the broadcast component 1022 may transmit a NACK to the second device 1050 indicating that the PDU was not properly received, and the second device 1050 retransmits another PDU. In some aspects, if the calculated MIC 728 does not pass the MIC check, then the broadcast component 1022 may transmit the NACK to the second device 1050, while in some aspects, if the calculated MIC 728 does pass the MIC check, then the broadcast component 1022 may transmit the ACK to the second device 1050 indicating that the PDU was properly received.

The apparatus may include additional components that perform each of the blocks of the algorithm in the aforementioned flowcharts of FIGS. 4, 5, and 7. As such, each block in the aforementioned flowcharts of FIGS. 4, 5, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
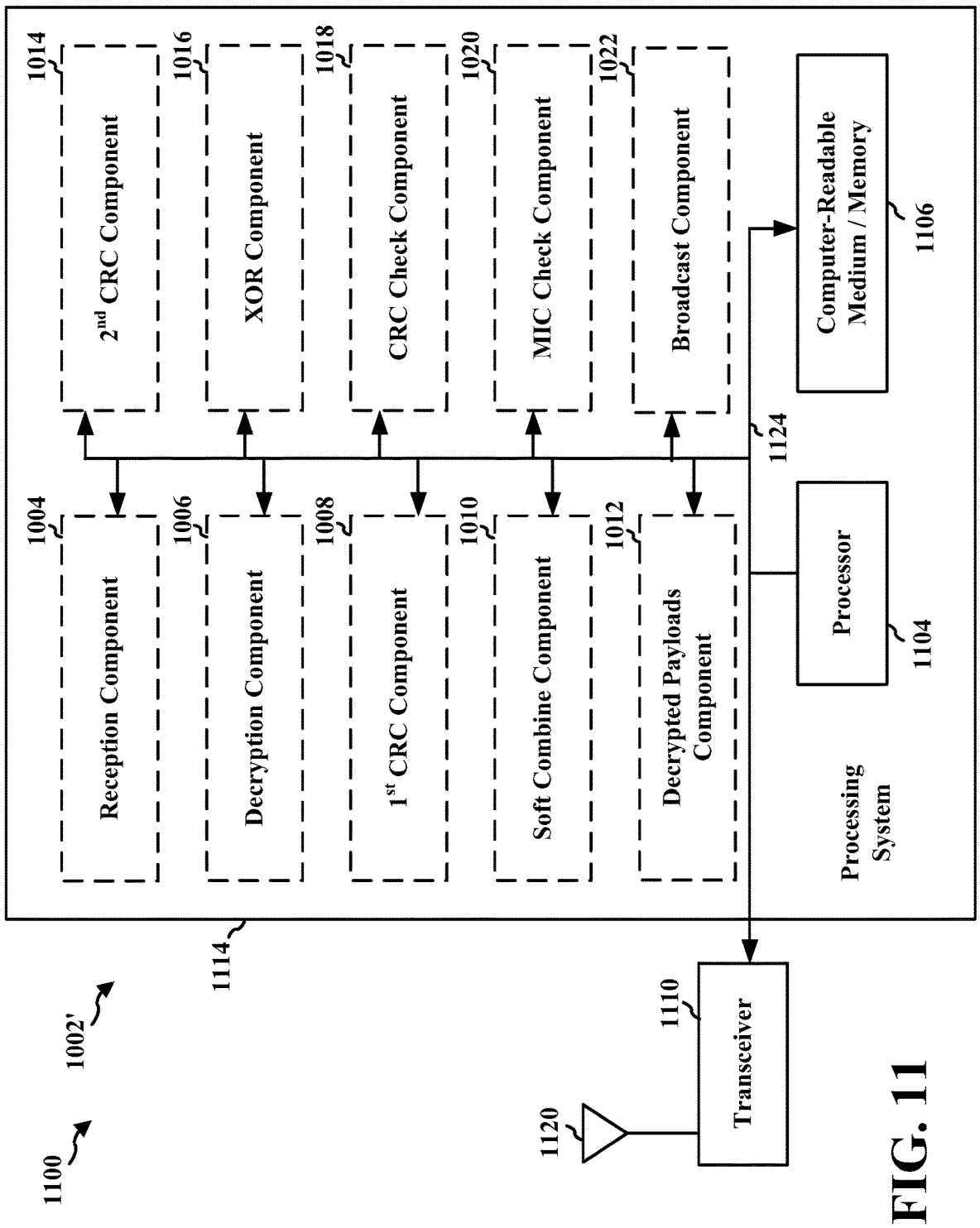
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, 1018, 1020, 1022 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the broadcast component 1020, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016, 1018, 1020, and 1022. The components may be software components running in the processor 1104, resident/stored in the computer readable medium/memory 1106, one or more hardware components coupled to the processor 1104, or some combination thereof.

In certain configurations, the apparatus 1002/1002' for wireless communication may include means for receiving a first packet data unit (PDU) and a first cyclic redundancy check (CRC) that is based on the first PDU, the first PDU being encrypted based on a first nonce, means for decrypting the first PDU to obtain a first payload and a first cipher stream, means for soft combining the decrypted first payload with a decrypted set of payloads, the set of payloads having been encrypted based on at least one nonce different than the first nonce, means for generating a second CRC based on the soft combined decrypted payloads and based on the first cipher stream, means for determining whether the generated second CRC for the soft combined decrypted payloads passes a CRC check against the first CRC, means for receiving a set of PDUs, means for decrypting each PDU in the set of PDUs after the PDU is received to obtain a corresponding decrypted payload of the decrypted set of payloads, means for sending a negative ACK (NACK), after failing to properly validate a received CRC, based on the encrypted data, against a calculated CRC, based on the soft combined data, indicating that the PDU was improperly received, means for wherein the first PDU is received based on the sent NACK, means for appending a payload header to the soft combined decrypted payloads and zero padding the first cipher stream before generating the second CRC, means for generating a third CRC based on the soft combined decrypted payloads, means for generating a fourth CRC based on the first cipher stream, means for XORing the generated third CRC and the generated fourth CRC to obtain the second CRC, means for appending a header to the soft combined decrypted payloads before generating the third CRC, means for zero padding the first cipher stream before generating the fourth CRC, wherein the first PDU is decrypted further to obtain a first message integrity check (MIC), further comprising means for generating a second MIC based on the soft combined decrypted payloads, further comprising means for determining whether the generated second MIC passes a MIC check against the first MIC. The aforementioned means may be one or more of the aforementioned processor(s) 202, the short-range communications controller 252, and/or radio 230 in FIG. 2, components of apparatus 1002/1002' configured to perform the functions recited by the aforementioned means.

Figure 12:
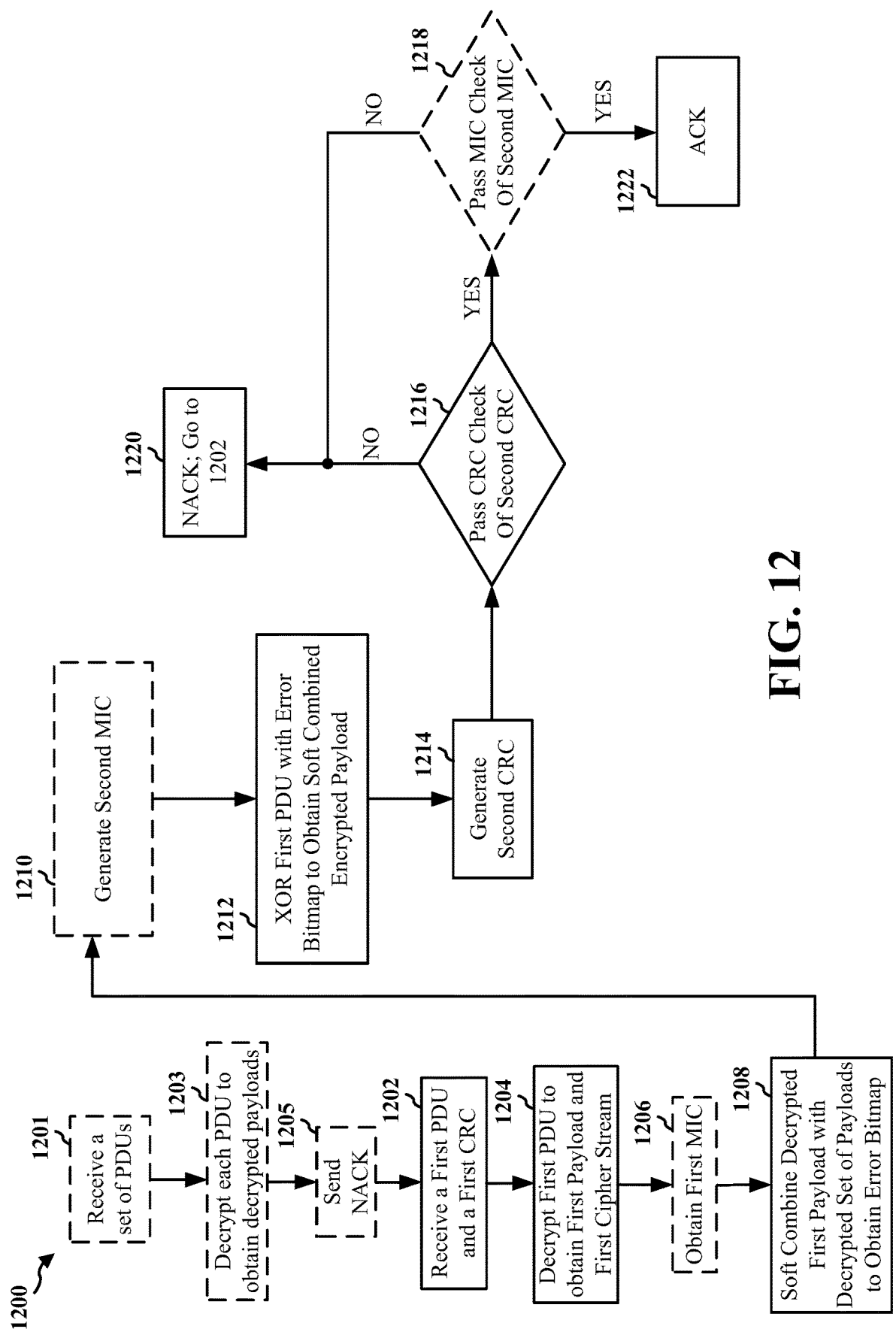
FIG. 12 is a flowchart of a method of wireless communication.

FIG. 12 is a flowchart 1200 of a method of wireless communication. The method may be performed by a first device (e.g., the central device 102, peripheral device 104, 106, 108, 110, 112, 114, wireless device 200, the apparatus 1002/1002') in communication with a second device (e.g., central device 102, peripheral device 104, 106, 108, 110, 112, 114, wireless device 200). In FIG. 12, optional operations are indicated with dashed lines.

Referring to FIG. 12, at 1201, the first device may be configured to receive a set of PDUs, as discussed in reference to FIGS. 6 and 8. At 1203, the first device may decrypt, at decryption block 604, 804, each PDU in the set of PDUs after the PDU is received to obtain a corresponding decrypted payload of the decrypted set of payloads, as discussed in reference to FIGS. 6 and 8. At 1205, the first device may be configured to send a NACK after failing to properly validate a received CRC, based on the encrypted data, against a calculated CRC, based on the soft combined data. In such aspects, the first device sending the NACK may indicate that the PDU was improperly received by the first device. In some aspects, a first PDU (e.g., encrypted data 602, 802) may be received by the first device based on the sent NACK.

At 1202, the first device may receive a first PDU (e.g., encrypted data 602, 802) and a first CRC that is based on the first PDU. In some aspects, as discussed in reference to FIGS. 6 and 8, the first PDU (e.g., encrypted data 602, 802) may be encrypted based on a first nonce.

At 1204, the first device may be configured to decrypt, at decryption block 604, 804, the first PDU (e.g., encrypted data 602, 802) to obtain a first payload (e.g., decrypted data 606, 810). For example, with reference to FIGS. 6 and 8, the decryption block 604, 804 receives the encrypted data 602, 802 and generates the decrypted data 606, 810. At 1206, the first device may be configured to decrypt, at decryption block 804, the first PDU (e.g., encrypted data 802) to obtain a first MIC.

At 1208, the first device may be configured to soft combine, at RTSC block 608, 812, the decrypted first payload (e.g., decrypted data 606, 810) with a decrypted set of payloads to obtain an error bitmap 610, 814. In some aspects, the set of payloads have been encrypted based on at least one nonce different than the first nonce. However, in some aspects, the set of payloads may be encrypted based on a nonce that is the same as the first nonce. At 1210, the first device may be configured to generate a second MIC (e.g., calculated MIC 824) based on the soft combined decrypted payloads (e.g., soft combined decrypted data 816). For example, the decrypted data 810 is soft combined at the RTSC block 812 and the soft combined decrypted data 816 is outputted back to the decryption block 804, so that that decryption block 804 can further decrypt the soft combined decrypted data 816 to obtain the second MIC (e.g., calculated MIC 824). In some aspects, the decryption block 804 may comprise an AES block for MIC calculation 808, which receives the soft combined decrypted data 816 and generates a calculated MIC 824 based on the soft combined decrypted data 816.

At 1212, the first device may be configured to XOR, at XOR 612, 818, the received first PDU (e.g., encrypted data 602, 802) with the obtained error bitmap 610, 814 to obtain a soft combined encrypted payload. At 1214, the first device may be configured to generate a second CRC (e.g., calculated CRC 820) based on the soft combined encrypted payload 614 which is the result of the XOR of the received first PDU (e.g., encrypted data 602, 802) and the obtained error bitmap 610, 814.

At 1216, the first device may determine whether the generated second CRC (e.g., calculated CRC 820) for the soft combined encrypted payload (e.g., soft combined encrypted data 614) passes a CRC check, at CRC check 616, 822, against the first CRC based on the encrypted data 602, 802. If the generated second CRC does not pass the CRC check, the at 1220, a NACK is sent by the first device to the second device, which results in a retransmission of the PDU, and the process is repeated starting at 1202. If the generated second CRC does pass the CRC check, then at 1218, the first device may determine whether the generated second MIC (e.g., calculated MIC 824) passes a MIC check (e.g., MIC check 826) against the first MIC. If the generated second MIC does not pass the MIC check, then at 1220, a NACK is sent by the first device to the second device, which may result in the retransmission of the PDU and the process is repeated starting at 1202. If the generated second MIC does pass the MIC check, then at 1222, the first device may transmit an ACK to the second device. The transmission of an ACK to the second device indicates that the PDU was properly received, such that the soft combined decrypted data performed at RTSC block 608, 812, was properly combined.

In yet some aspects, an ACK may be sent by the first device when both the generated second CRC (e.g., calculated CRC 820) passes the CRC check 616 against the first CRC and the generated second MIC (e.g., calculated MIC 824) passes a MIC check 826 against the first MIC.

Figure 13:
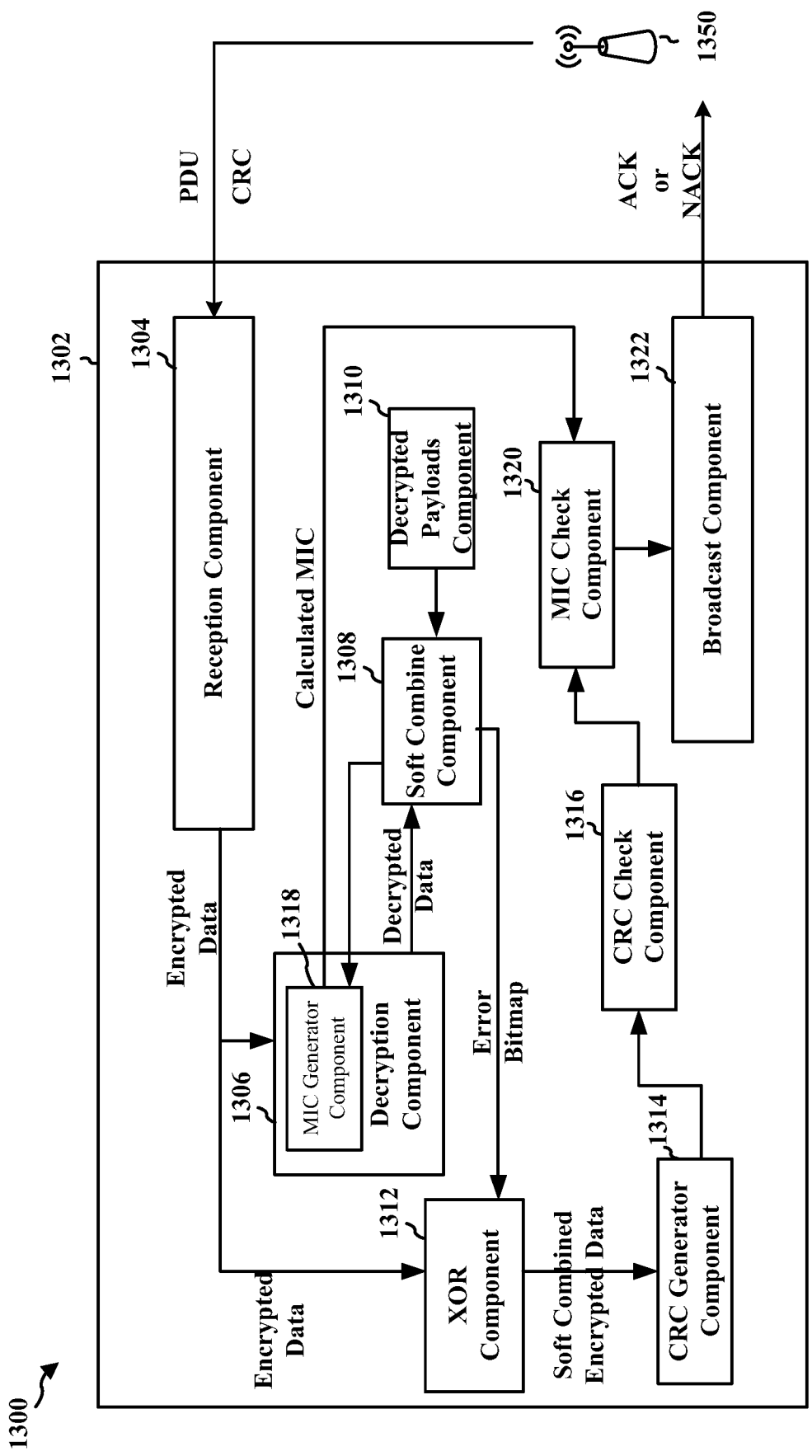
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a first device (e.g., central device 102, peripheral device 104, 106, 108, 110, 112, 114, wireless device 200, the apparatus 1002') in communication with a second device (e.g., central device 102, peripheral device 104, 106, 108, 110, 112, 114, wireless device 200). The apparatus includes a reception component 1304, a decryption component 1306, a soft combine component 1308, a decrypted payloads component 1310, an XOR component 1312, a CRC generator component 1314, a CRC check component 1316, MIC check component 1318, and a broadcast component 1320.

The reception component 1304 may be configured to receive a first PDU and a first CRC that is based on the first PDU from the second device 1350. In some aspects, the first PDU (e.g., encrypted data 602, 802) may be encrypted based on a first nonce. In some aspects, the first device may receive a set of PDUs, and decrypt, at decryption block 604, 804, each PDU in the set of PDUs after the PDU is received to obtain a corresponding payload of the decrypted set of payloads, as discussed in reference to FIGS. 6, 8. In some aspects, the first device may be configured to send a NACK after failing to properly validate, at block 616, 822 a received CRC, based on the encrypted data, against a calculated CRC, based on the soft combined data. In such aspects, the first device sending the NACK may indicate that the PDU (e.g., encrypted data 602, 802) was improperly received by the first device. In some aspects, the first PDU (e.g., encrypted data 602, 802) may be received based on the sent NACK.

The decryption component 1306 may be configured to receive the encrypted data (e.g., first PDU) from the reception component 1304 and decrypt, at decryption block 604, 804, the first PDU to obtain a first payload (e.g., decrypted data 606, 810). In some aspects, the first PDU may be decrypted further, at decryption block 804, to obtain a first MIC corresponding to the first PDU (e.g., encrypted data 602, 802).

The soft combine component 1308 may be configured to soft combine, at RTSC block 612, 812, the decrypted first payload (e.g., decrypted data 606, 810) with a decrypted set of payloads to obtain an error bitmap 814. In some aspects, the set of payloads have been encrypted based on at least one nonce different than the first nonce. However, in some aspects, the set of payload may be encrypted based on a nonce that is the same as the first nonce. The MIC generator component 1318 may be configured to generate a second MIC (e.g., calculated MIC 824) based on the soft combined decrypted payloads (e.g., soft combined decrypted data 816). For example, the decrypted data 810 is soft combined at the RTSC block 812 and the soft combined decrypted data 816 is outputted back to the decryption block 804, so that that decryption block 804 can further decrypt the soft combined decrypted data 816 to obtain the second MIC (e.g., calculated MIC 824). In some aspects, the decryption block 804 comprises an AES block for MIC calculation 808, which receives the soft combined decrypted data 816 and generates a calculated MIC 824 based on the soft combined decrypted data 816.

The XOR component 1312 may be configured to receive the error bitmap 814 from the soft combine component 1308 and receive the encrypted data 802 to perform an XOR operation between the error bitmap 814 and the encrypted data 802 to obtain a soft combined encrypted payload (e.g., soft combined encrypted data 614). The CRC generator component 1314 may receive the soft combined encrypted data from the XOR component 1312 in order to generate a second CRC (e.g., calculated CRC 820) based on the soft combined encrypted payload 614. The CRC check component 1316 may be configured to determine whether the generated second CRC (e.g., calculated CRC 820) for the soft combined encrypted payload (e.g., soft combined encrypted data 614) passes a CRC check, at CRC check 616, against the first CRC based on the encrypted data 602. The MIC check component 1320 may be configured to determine whether the generated MIC (e.g., calculated MIC 824) passes a MIC check (e.g., block 826) against the first MIC based on the encrypted data. The broadcast component 1322 may be configured to transmit an ACK when both the generated CRC (e.g., calculated CRC 820) passes the CRC check 822 against the first CRC based on the first PDU, and when the generated second MIC (e.g., calculated MIC 824) passes the MIC check 826 against the first MIC based on the first PDU. If the generated second CRC does not pass the CRC check then the broadcast component 1322 may transmit a NACK to the second device, which may result in a retransmission of the PDU. If the generated second CRC does pass the CRC check, then the MIC check component 1320 may determine whether the generated second MIC (e.g., calculated MIC 824) passes the MIC check (e.g., MIC check 826) against the first MIC. If the generated second MIC does not pass the MIC check, then the broadcast component 1322 may send NACK to the second device, which may result in the retransmission of the PDU. If the generated second MIC does pass the MIC check, then the broadcast component 1322 may transmit an ACK to the second device 1350. The transmission of an ACK to the second device 1350 indicates that the PDU was properly received, such that the soft combined decrypted data performed at RTSC block 608, 812, was properly combined.

The apparatus may include additional components that perform each of the blocks of the algorithm in the aforementioned flowcharts of FIGS. 6 and 8. As such, each block in the aforementioned flowcharts of FIGS. 6 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
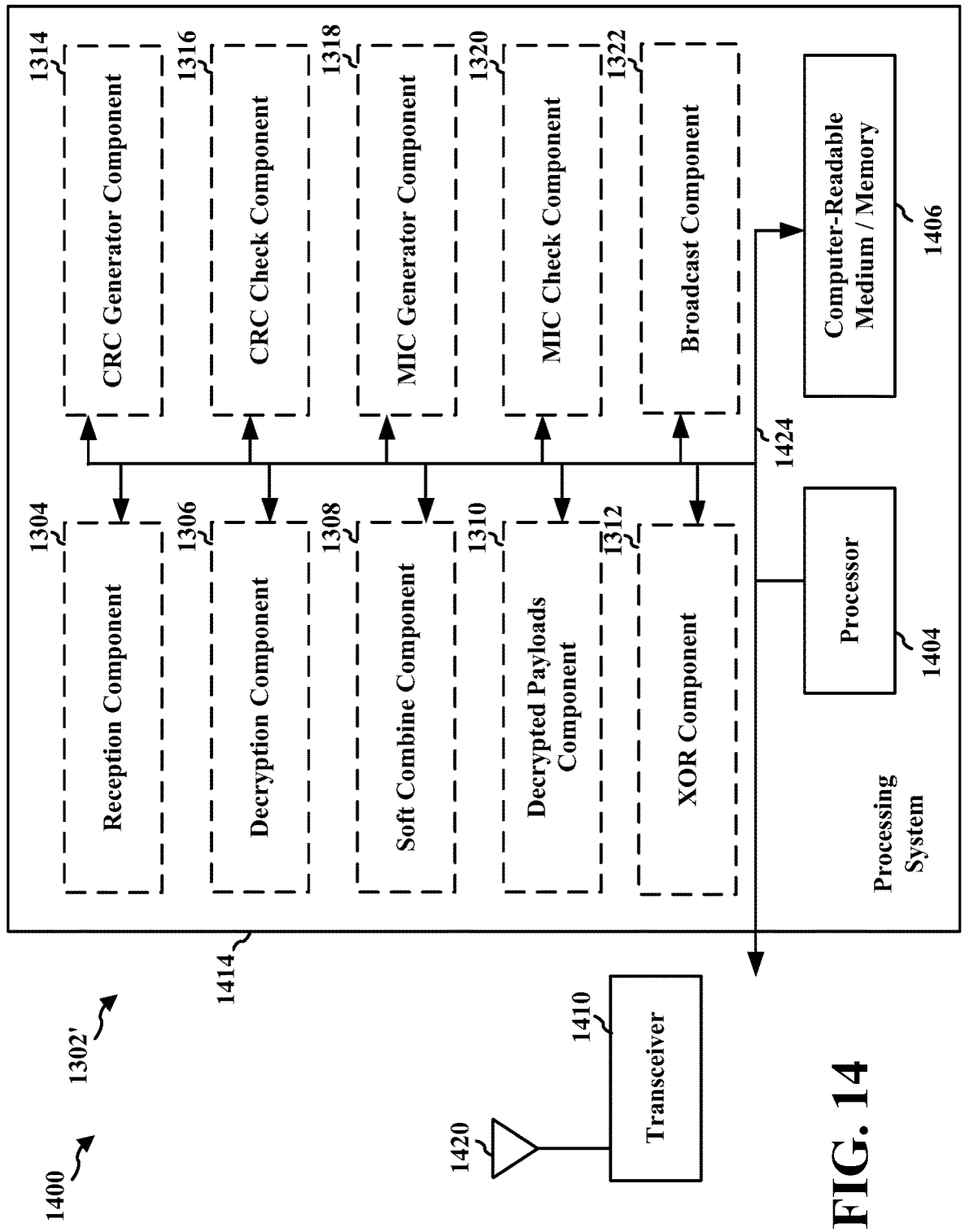
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318 and the computer-readable medium/memory 1406.

The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the broadcast component 1320, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318, 1320, and 1322. The components may be software components running in the processor 1404, resident/stored in the computer readable medium/memory 1406, one or more hardware components coupled to the processor 1404, or some combination thereof.

In certain configurations, the apparatus 1302/1302' for wireless communication may include means for receiving a first packet data unit (PDU) and a first cyclic redundancy check (CRC) that is based on the first PDU, the first PDU being encrypted based on a first nonce, means for decrypting the first PDU to obtain a first payload, means for obtaining an error bitmap by soft combining the decrypted first payload with a decrypted set of payloads, the set of payloads having been encrypted based on at least one nonce different than the first nonce, means for XORing the received first PDU with the obtained error bitmap to obtain a soft combined encrypted payload, means for generating a second CRC based on the soft combined encrypted payload, means for determining whether the generated second CRC for the soft combined encrypted payload passes a CRC check against the first CRC, means for receiving a set of PDUs, means for decrypting each PDU in the set of PDUs after the PDU is received to obtain a corresponding decrypted payload of the decrypted set of payloads, means for sending a negative ACK (NACK), after failing to properly validate a received CRC, based on the encrypted data, against a calculated CRC, based on the soft combined data, indicating that the PDU was improperly received, wherein the first PDU is received based on the sent NACK, wherein the first PDU is decrypted further to obtain a first message integrity check (MIC), further comprising means for generating a second MIC based on the soft combined decrypted payloads, wherein the ACK is sent when both the generated second CRC passes the CRC check against the first CRC and the generated second MIC passes a MIC check against the first MIC. The aforementioned means may be one or more of the aforementioned processor(s) 202, the short-range communications controller 252, and/or radio 230 in FIG. 2, components of apparatus 1002/1002' configured to perform the functions recited by the aforementioned means.

Although the present disclosure discusses the scheme of validating the combination of decrypted data packets in relation to BLE technologies, it is understood that such scheme may also be applicable to BT technologies. In addition, the scheme may be applied to 802.15.4 based protocols, such as Zigbee, or any other wireless protocol wherein a packet and its retransmitted packets may be sent using different encryption parameters.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving a first packet data unit (PDU) and a first cyclic redundancy check (CRC) that is based on the first PDU, the first PDU being encrypted based on a first cipher stream;
   decrypting the first PDU to obtain a first payload based on the first cipher stream;
   soft combining the decrypted first payload with a decrypted set of payloads, the set of payloads having been encrypted based on at least one cipher stream different than the first cipher stream;
generating a second CRC based on the soft combined decrypted payloads and based on the first cipher stream; and
determining whether the generated second CRC for the soft combined decrypted payloads passes a CRC check against the first CRC.

2. The method of claim 1, further comprising:
receiving a set of PDUs;
decrypting each PDU in the set of PDUs after the PDU is received to obtain a corresponding decrypted payload of the decrypted set of payloads; and
sending a negative acknowledgement (NACK), after failing to properly validate a received CRC against a calculated CRC, indicating that the PDU was improperly received,
wherein the first PDU is received based on the sent NACK.

3. The method of claim 1, further comprising appending a payload header to the soft combined decrypted payloads and zero padding the first cipher stream before generating the second CRC.

4. The method of claim 1, wherein the second CRC is generated by:
generating a third CRC based on the soft combined decrypted payloads;
generating a fourth CRC based on the first cipher stream; and
XORing the generated third CRC and the generated fourth CRC to obtain the second CRC.

5. The method of claim 4, further comprising:
appending a header to the soft combined decrypted payloads before generating the third CRC; and
zero padding the first cipher stream before generating the fourth CRC.

6. The method of claim 1, wherein a message integrity check (MIC) portion of the first PDU is decrypted to obtain a first MIC, the method further comprising generating a second MIC based on the soft combined decrypted payloads, the method further comprising determining whether the generated second MIC passes a MIC check against the first MIC.

7. An apparatus for wireless communication, comprising:
means for receiving a first packet data unit (PDU) and a first cyclic redundancy check (CRC) that is based on the first PDU, the first PDU being encrypted based on a first cipher stream;
means for decrypting the first PDU to obtain a first payload based on the first cipher stream;
means for soft combining the decrypted first payload with a decrypted set of payloads, the set of payloads having been encrypted based on at least one cipher stream different than the first cipher stream;
means for generating a second CRC based on the soft combined decrypted payloads and based on the first cipher stream; and
means for determining whether the generated second CRC for the soft combined decrypted payloads passes a CRC check against the first CRC.

8. The apparatus of claim 7, further comprising:
means for receiving a set of PDUs;
means for decrypting each PDU in the set of PDUs after the PDU is received to obtain a corresponding decrypted payload of the decrypted set of payloads; and
means for sending a negative acknowledgement (NACK), after failing to properly validate a received CRC against a calculated CRC, indicating that the PDU was improperly received,
wherein the first PDU is received based on the sent NACK.

9. The apparatus of claim 7, further comprising means for appending a payload header to the soft combined decrypted payloads and zero padding the first cipher stream before generating the second CRC.

10. The apparatus of claim 7, further comprising:
means for generating a third CRC based on the soft combined decrypted payloads;
means for generating a fourth CRC based on the first cipher stream; and
means for XORing the generated third CRC and the generated fourth CRC to obtain the second CRC.

11. The apparatus of claim 10, further comprising:
means for appending a header to the soft combined decrypted payloads before generating the third CRC; and
means for zero padding the first cipher stream before generating the fourth CRC.

12. The apparatus of claim 7, wherein a message integrity check (MIC) portion of the first PDU is decrypted to obtain a first MIC, further comprising means for generating a second MIC based on the soft combined decrypted payloads, further comprising means for determining whether the generated second MIC passes a MIC check against the first MIC.

13. An apparatus for wireless communication, comprising:
a memory; and
at least one processor coupled to the memory and configured to:
receive a first packet data unit (PDU) and a first cyclic redundancy check (CRC) that is based on the first PDU, the first PDU being encrypted based on a first cipher stream;
decrypt the first PDU to obtain a first payload based on the first cipher stream;
soft combine the decrypted first payload with a decrypted set of payloads, the set of payloads having been encrypted based on at least one cipher stream different than the first cipher stream;
generate a second CRC based on the soft combined decrypted payloads and based on the first cipher stream; and
determine whether the generated second CRC for the soft combined decrypted payloads passes a CRC check against the first CRC.

14. The apparatus of claim 13, wherein the at least one processor is further configured to:
receive a set of PDUs;
decrypt each PDU in the set of PDUs after the PDU is received to obtain a corresponding decrypted payload of the decrypted set of payloads; and
send a negative acknowledgement (NACK), after failing to properly validate a received CRC against a calculated CRC, indicating that the PDU was improperly received,
wherein the first PDU is received based on the sent NACK.

15. The apparatus of claim 13, wherein the at least one processor is further configured to append a payload header to the soft combined decrypted payloads and zero padding the first cipher stream before generating the second CRC.

16. The apparatus of claim 13, wherein to generate the second CRC the at least one processor is configured to:
- generate a third CRC based on the soft combined decrypted payloads;
- generate a fourth CRC based on the first cipher stream; and
- XOR the generated third CRC and the generated fourth CRC to obtain the second CRC.

17. The apparatus of claim 16, wherein the at least one processor is further configured to:
- append a header to the soft combined decrypted payloads before generating the third CRC; and
- zero pad the first cipher stream before generating the fourth CRC.

18. The apparatus of claim 13, wherein a message integrity check (MIC) portion of the first PDU is decrypted to obtain a first MIC, wherein the at least one processor is further configured to:
- generate a second MIC based on the soft combined decrypted payloads; and
- determine whether the generated second MIC passes a MIC check against the first MIC.

19. A non-transitory computer-readable medium storing computer executable code, comprising code to:
- receive a first packet data unit (PDU) and a first cyclic redundancy check (CRC) that is based on the first PDU, the first PDU being encrypted based on a first cipher stream;
- decrypt the first PDU to obtain a first payload based on the first cipher stream;
- soft combine the decrypted first payload with a decrypted set of payloads, the set of payloads having been encrypted based on at least one cipher stream different than the first cipher stream;
- generate a second CRC based on the soft combined decrypted payloads and based on the first cipher stream; and
- determine whether the generated second CRC for the soft combined decrypted payloads passes a CRC check against the first CRC.

\* \* \* \* \*